(12) United States Patent
Arduini

(10) Patent No.: US 8,522,466 B2
(45) Date of Patent: Sep. 3, 2013

(54) LOW-FORCE ROLLING TRIGGER

(75) Inventor: Douglas P. Arduini, San Ramon, CA (US)

(73) Assignee: Douglas P. Arduini, San Ramon, CA (US)

( * ) Notice: Subject to any disclaimer, the term of this patent is extended or adjusted under 35 U.S.C. 154(b) by 0 days.

(21) Appl. No.: 13/136,039

(22) Filed: Jul. 20, 2011

(65) Prior Publication Data

US 2012/0131832 A1    May 31, 2012

Related U.S. Application Data

(63) Continuation-in-part of application No. 12/702,106, filed on Feb. 8, 2010.

(51) Int. Cl.
*F41A 19/10*    (2006.01)

(52) U.S. Cl.
USPC ........................................... 42/69.01

(58) Field of Classification Search
USPC ................... 42/69.01, 69.02, 69.03; 89/27.3
See application file for complete search history.

(56) References Cited

U.S. PATENT DOCUMENTS

| | | | | | |
|---|---|---|---|---|---|
| 1,537,369 | A | * | 5/1925 | Nicholson | 42/59 |
| 4,754,567 | A | * | 7/1988 | Lehfeldt et al. | 42/69.02 |
| 4,908,970 | A | * | 3/1990 | Bell | 42/69.02 |
| 5,299,374 | A | * | 4/1994 | Mathys | 42/69.01 |

* cited by examiner

*Primary Examiner* — Stephen M Johnson
*Assistant Examiner* — John D Cooper
(74) *Attorney, Agent, or Firm* — David Lewis

(57) ABSTRACT

In an embodiment, a low-force, low-friction, short-travel, low-energy control rolling trigger utilizes a rolling element as a trigger-release mechanism in equipment, machines and tools such as for clutches, brakes, actuators, and projectile launchers. The rolling elements within the trigger mechanism reduce the friction, which in-turn reduces the force necessary to discharge trigger. In an embodiment, the trigger is part of a firearm and uses a mechanical trigger. In another embodiment, the trigger is activated by an electronic signal that activates a solenoid, which pulls the rolling element, and thereby releases the striker or in a trigger-release assembly.

8 Claims, 21 Drawing Sheets

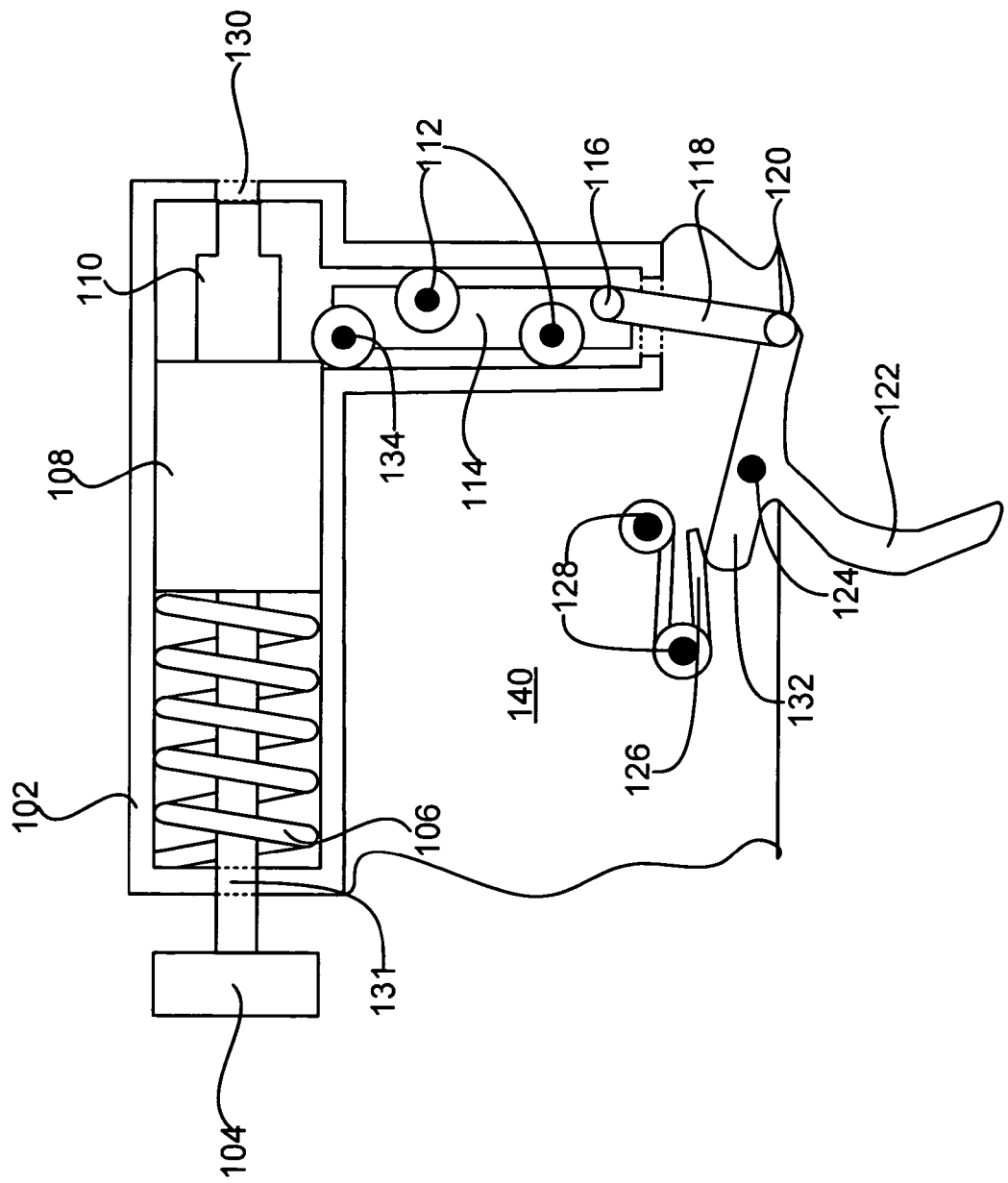

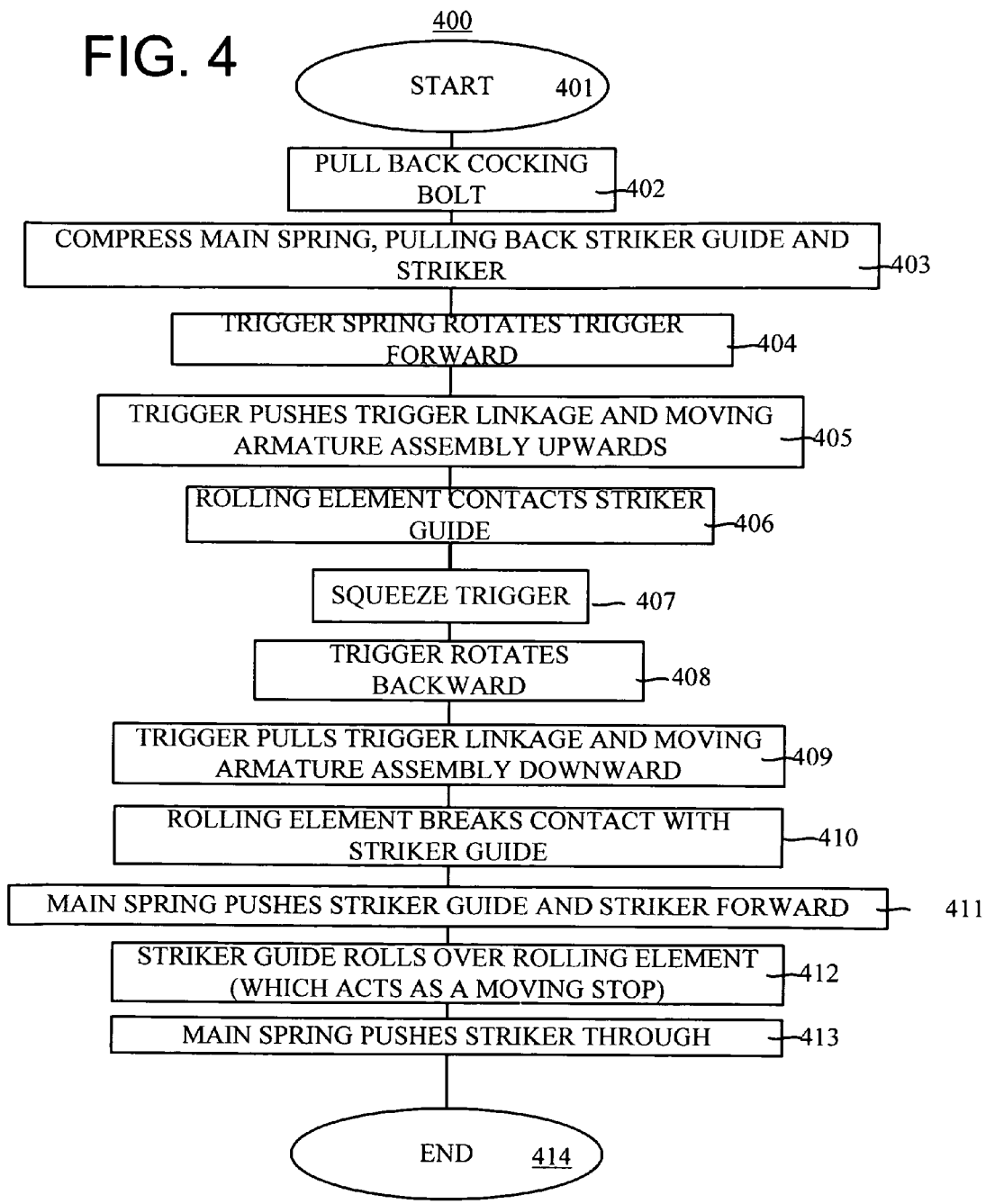

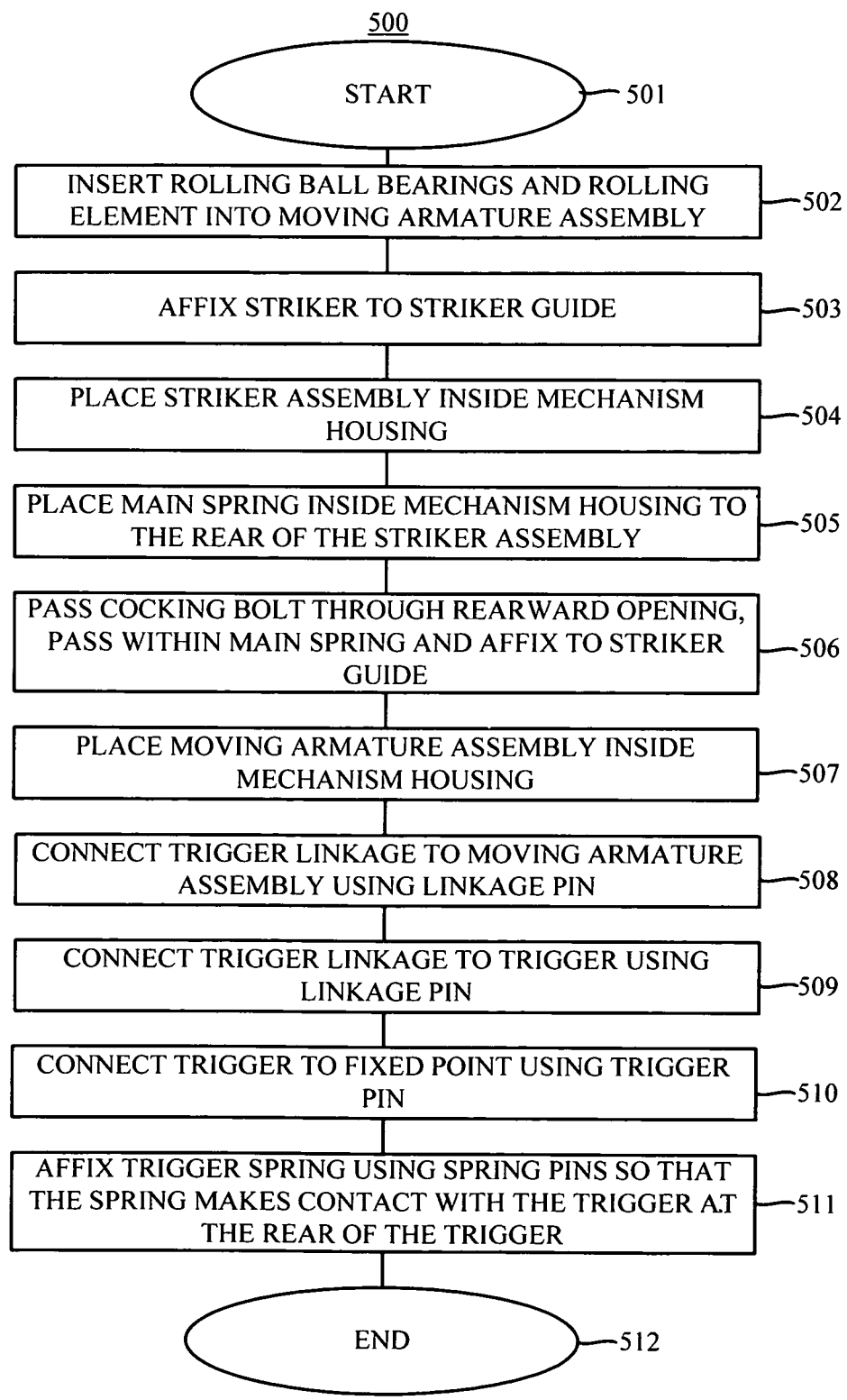

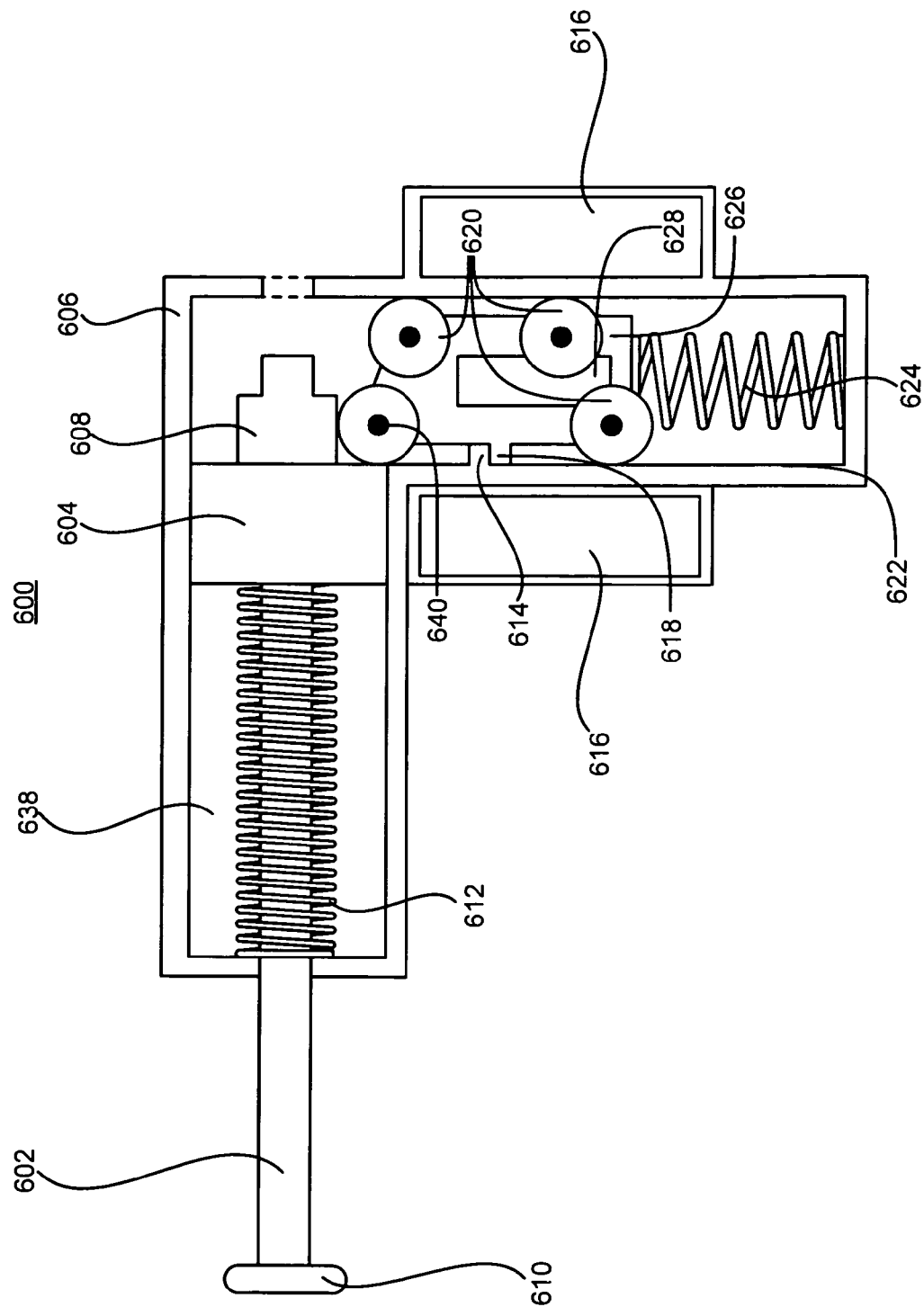

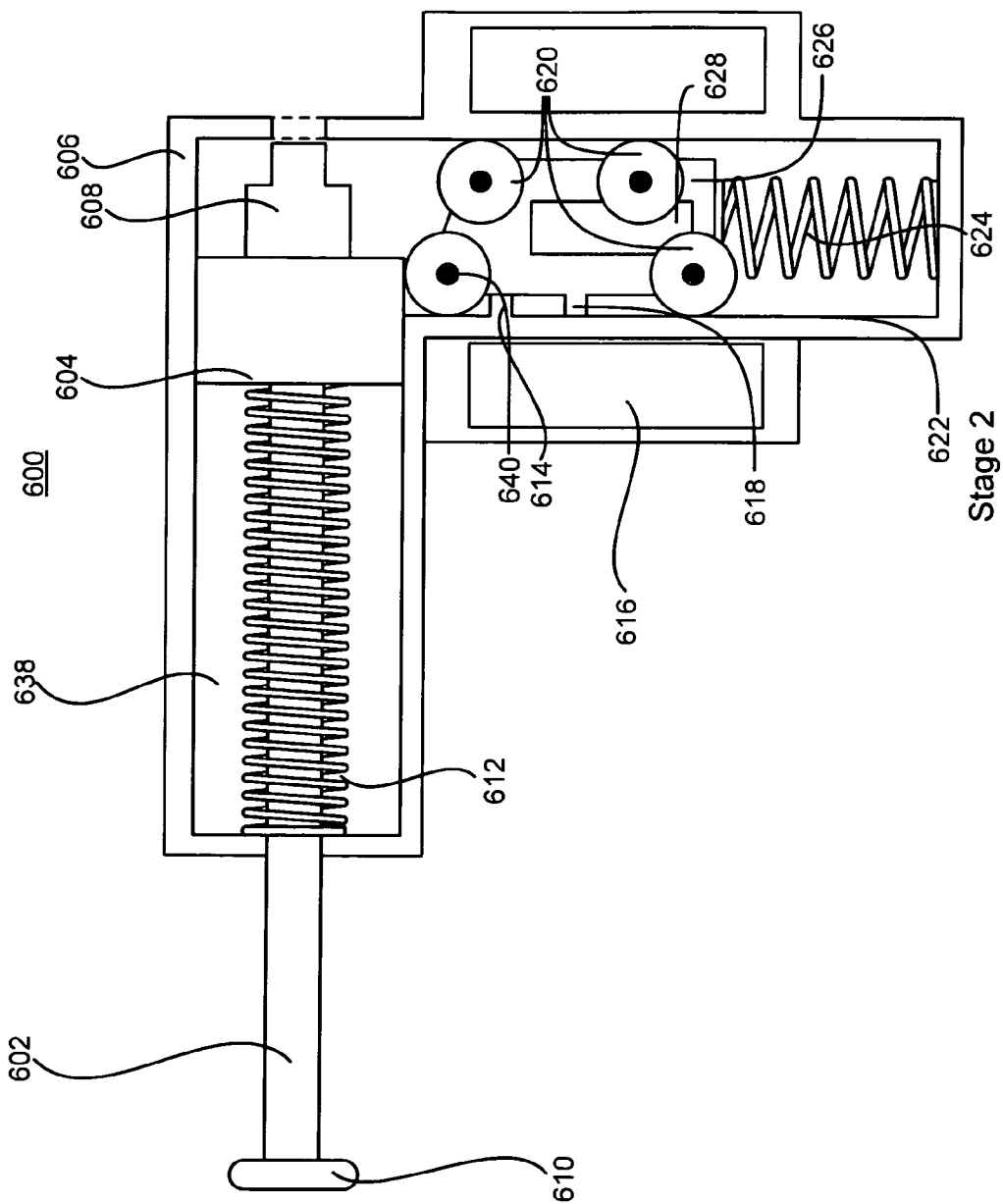

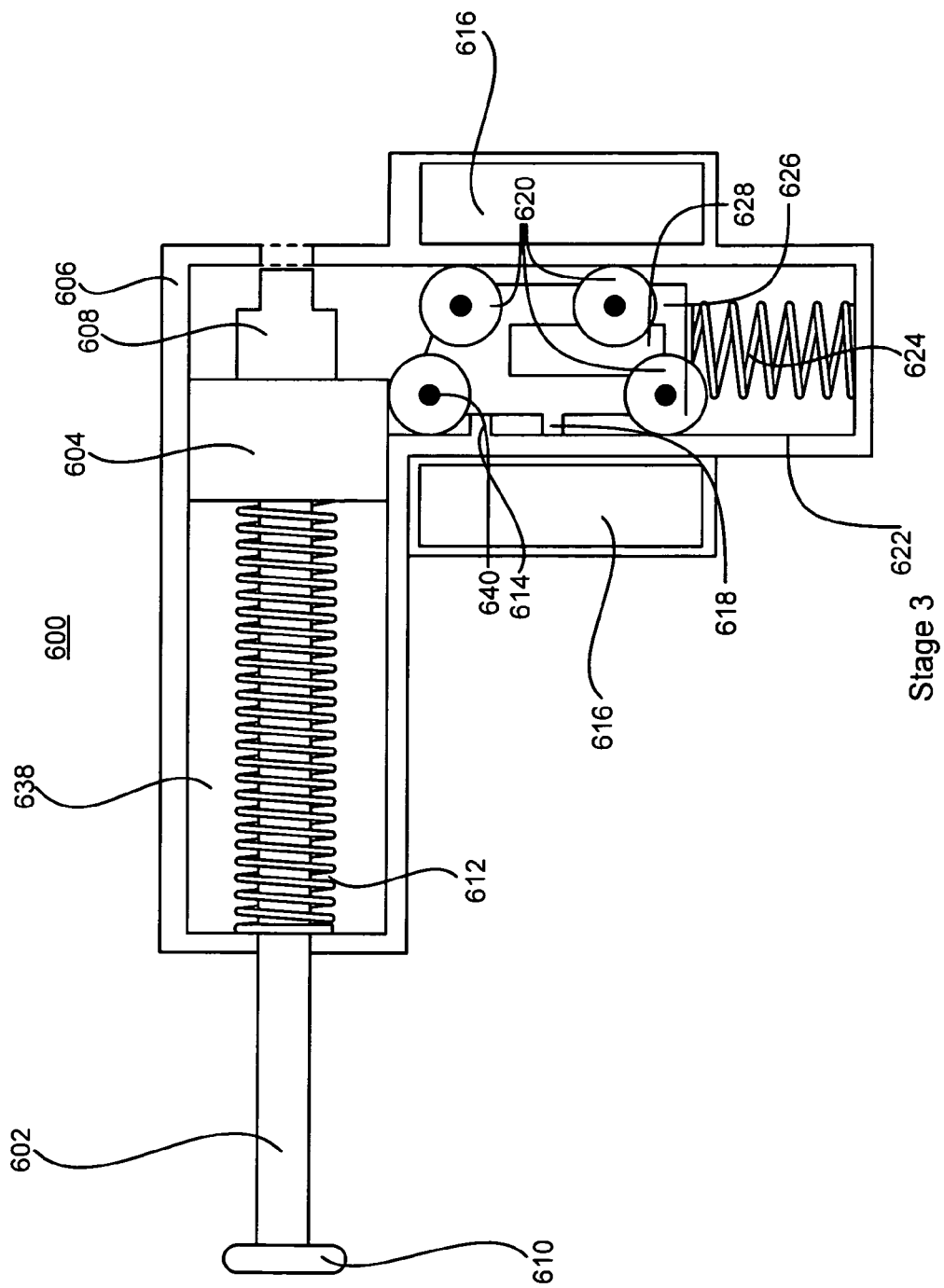

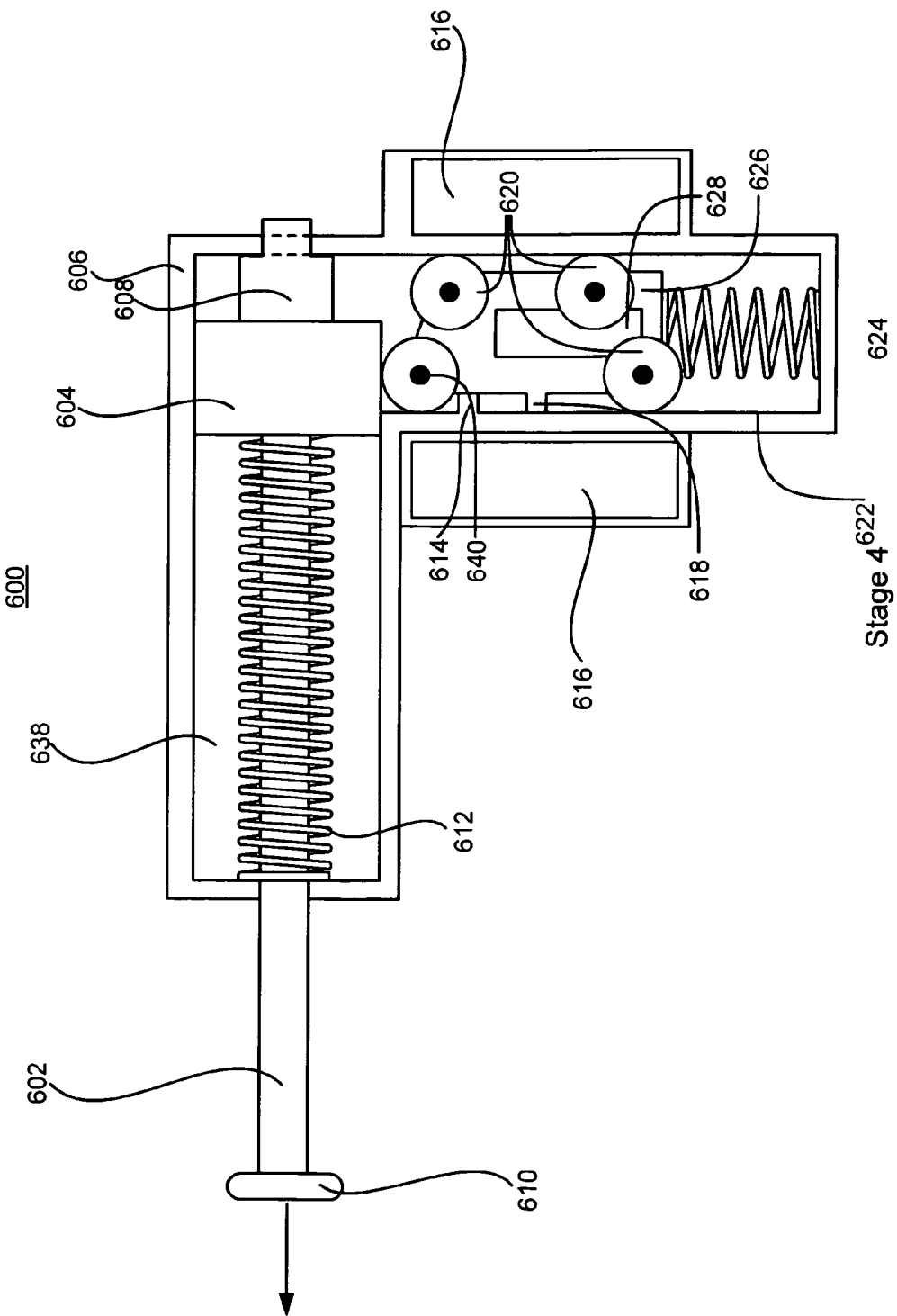

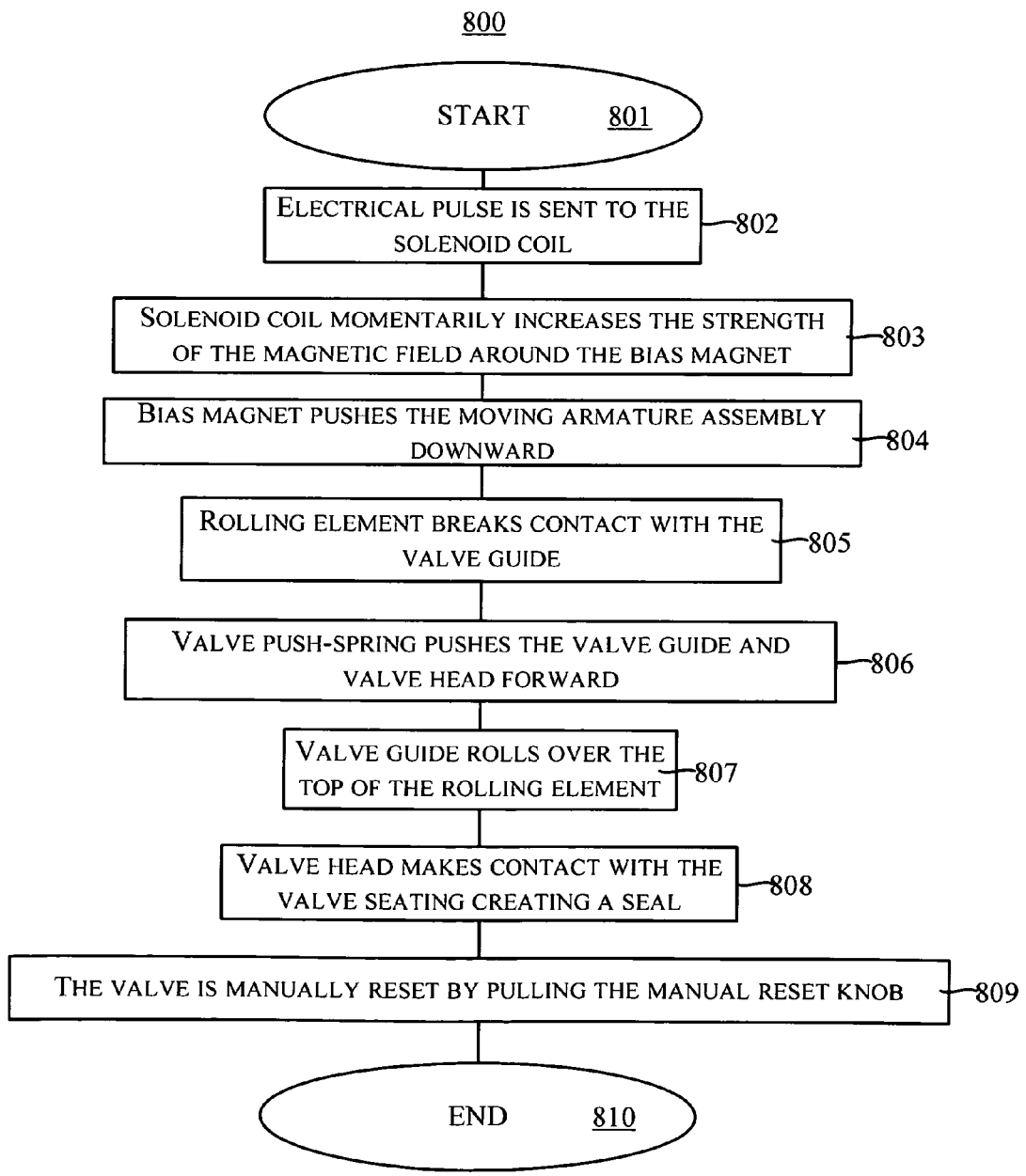

900

US 8,522,466 B2

LOW-FORCE ROLLING TRIGGER

CLAIM OF PRIORITY

This application is a continuation-in-part of U.S. Provisional patent application Ser. No. 12/702,106 entitled "Variable and Centrifugal Flywheel and Centrifugal Clutch," by Douglas P. Arduini, filed Feb. 8, 2010, the entire contents of which are incorporated herein by reference.

FIELD

The current specification relates to a manual trigger mechanism and to an electromagnetic trigger mechanism that may be used in equipment, tools, and firearms.

BACKGROUND

The subject matter discussed in the background section should not be assumed to be prior art merely as a result of its mention in the background section. Similarly, a problem mentioned in the background section should not be assumed to have been previously recognized in the prior art. The subject matter in the background section merely represents different approaches to accomplishing various tasks.

Triggers in firearms can often be classified into two basic types, which are single action and double action triggers. While there are many variations within each type and while there are many alternative trigger types, most guns utilize either a single or double action trigger.

In a single action trigger, the firing hammer is fully cocked, known as stage one, and the trigger pull performs the single action of dropping the hammer to hit the firing pin and fire the round. When using a single action trigger, the shooter feels the trigger displace after the firearm has been discharged. The single action trigger popular among hunters and casual firearm enthusiasts.

In a double action trigger, the trigger pull performs the two actions of cocking the hammer, and then releasing the hammer to fire the round. When using the double action trigger, the shooter feels an initial displacement of trigger followed by a perceptible stop, which is the first stage. The shooter then applies additional force until the firearm discharges, which is the second stage. The double action trigger is preferred by the military and competitive marksmen.

The part of the trigger that contributes to the feel of the trigger pull is the sear. The sear being the portion of the trigger that holds the hammer (also referred to as a striker) back until the proper amount of pressure has been applied to the trigger.

This specification recognizes that a trigger pull that feels light and smooth would be preferable.

BRIEF DESCRIPTION OF THE FIGURES

In the following drawings like reference numbers and labels are used to refer to the same elements. Although the following figures depict various examples of inventions associated with this specification, the inventions associated with this specification are not limited to the examples depicted in the figures.

FIG. 2B shows a cross-sectional view of an embodiment of the second stage of a rolling trigger releasing the striker.

FIG. 4 shows a flowchart of an embodiment of a method of operating a rolling trigger.

FIG. 5 shows a flowchart of an embodiment of a method of making a rolling trigger.

FIG. 7A shows a cross-sectional view of the first stage an embodiment of a rolling trigger cycling closed then open.

FIG. 7B shows a cross-sectional view of the second stage an embodiment of a rolling trigger cycling closed then open.

FIG. 7C shows a cross-sectional view of the third stage an embodiment of a rolling trigger cycling closed then open.

FIG. 7D shows a cross-sectional view of the fourth stage an embodiment of a rolling trigger cycling closed then open.

FIG. 8 shows a flowchart of an example of a method of the operation of the rolling trigger.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1-3, 6, 7, 9-12 is a brief description of each element, which may have no more than the name of each of the elements in the particular figure that is being discussed. After the brief description of each element, each element of FIGS. 1-3, 6, 7, 9-12 is further discussed in numerical order. In general, each of FIGS. 1-14 is discussed in numerical order, and the elements within FIGS. 1-14 are also usually discussed in numerical order to facilitate easily locating the discussion of a particular element. Nonetheless, there is not necessarily any one location where all of the information of any element of FIGS. 1-14 is located. Unique information about any particular element or any other aspect of any of FIGS. 1-14 may be found in, or implied by, any part of the specification.

Figure 1:
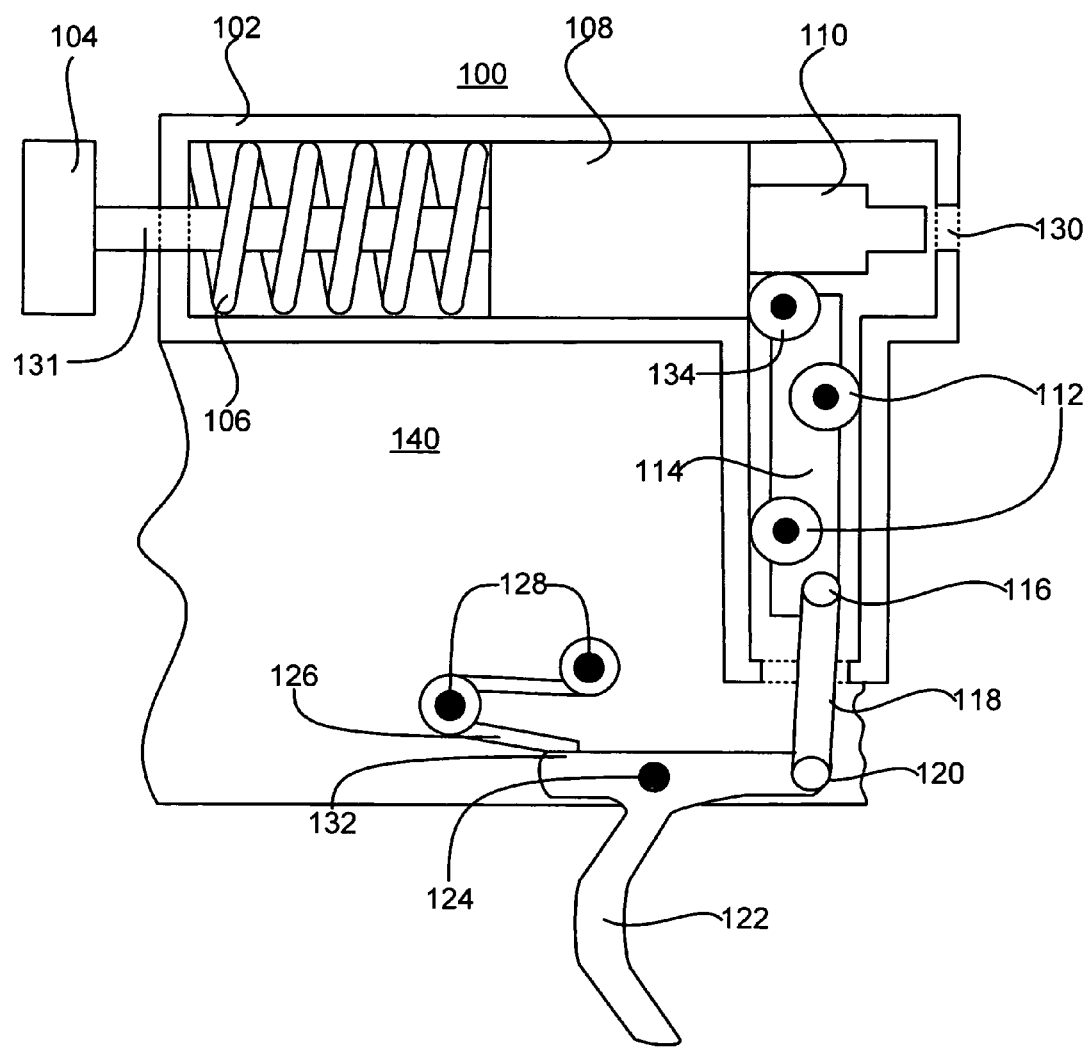
FIG. 1 shows a cross-sectional view of an embodiment of a rolling trigger.

FIG. 1 shows a cross-sectional view of an embodiment of a rolling trigger 100. Rolling trigger 100 may include enclosure 102, cocking bolt 104, main spring 106, pin support 108, striker 110, bearings 112, moving chassis assembly 114, trigger linkage pin 116, trigger linkage 118, trigger linkage pin 120, trigger 122, trigger pin 124, trigger spring 126, spring pins 128, forward circular opening 130, rearward circular opening 131, contact point 132, rolling element 134, and wall 140. In other embodiments, rolling trigger 100 may not have all of the components listed and/or may have other elements instead of, or in addition to, those listed above.

In this specification, the term cross sectional view is used to refer to a view in which the side of the enclosure is open so that the inner workings of the mechanism can be viewed, but (in contrast to a conventional cross-sectional view) the elements within the assembly may not have been cut at the cut line, so that it is easier to see the inner workings of the mechanism.

Rolling trigger 100 is used to hold and release a striker. Some functional qualities of a trigger that may be desirable include safety, a lightweight trigger pull, and a predictable and "crisp" feel during discharge. Additionally, it may be desirable that the shooter feel nearly no movement of the trigger during actual discharge of the firearm.

In an embodiment, rolling trigger 100, as well as the other trigger mechanism of this application may be used in various equipment, tools, and/or firearms to hold and release the movement of a mechanism, piston, or actuator that is biased and/or under high pressure to move from one point to another to perform a specific function. Rolling trigger 100 and the other rigger mechanisms of this specification may operate best with the ability to hold back high pressure mechanisms, may have low friction, may need low energy to move between a hold position and release position, may need a short length of travel, and/or may provide a smooth and even travel.

Any of the mechanism of this specification may be used to fire a gun, open and close a valve. All of the mechanisms of the this specification may be used for triggers in machines, tools, and equipment for uses such as, but not limited to, clutches, brakes, actuators, pistons, projectile launchers, etc. Any of the triggers of this specification may be operated manually or automated and controlled by an electromagnetic remote control.

Enclosure 102 is a chamber that protects the inner portion of rolling trigger 100, and may be used to contain and guide the internal components of rolling trigger 100. In other embodiments, other guides may be used instead of or in addition to enclosure 102. In an embodiment, enclosure 102 is tubular in shape, but may have other shapes and cross-sections in other embodiments. Cocking bolt 104 is a rod connected to a handle connecting to a pin support and may be used to pull back the pin support and striker. Main spring 106 may be a compression spring and may be used to store energy used to push firing the pin support and striker forward. Although main spring 106 is illustrated as a coil spring, other springs may be used instead.

Pin support 108 (which may also be referred to as a piston) may be used to ensure the proper alignment of the striker and may act as a contact point to lock rolling trigger 100 in place. Cocking bolt 104 may be used to pull back the pin support 108. Main spring 106 may be used to push pin support 108 forward.

Striker 110 is piece of material that may be used to strike a target, such as a projectile, a gunpowder charge, or blasting cap, for example. In an embodiment, striker 110 may be metallic and cylindrical. One example of a striker is a firing pin valve head or other actuator. The terms firing pin, actuator, or valve head may be substituted for the term striker in this specification to get specific embodiments. Cocking bolt 104 may be used to pull back striker 110 (with pin support 108).

Striker 110 may also be referred to as a striker. Main spring 106 may be used to push striker 110 (with pin support 108) forward.

Rolling bearings 112 may be wheels, ball bearings, cylindrical rollers, or another rolling bearing mounted into the moving chassis assembly, and may be used to facilitate the movement of moving chassis assembly. Anywhere the term moving chassis assembly is used, the alternative term rolling assembly can be used and vise-a-versa.

Moving chassis assembly 114 is a linkage containing rolling bearings 112 and rolling element 134, and may be used to ensure smooth and guided movement of the trigger. Bearings 112 may be mounted onto the moving chassis assembly 114, which may facilitate the movement of moving chassis assembly 114.

Figure 2A:
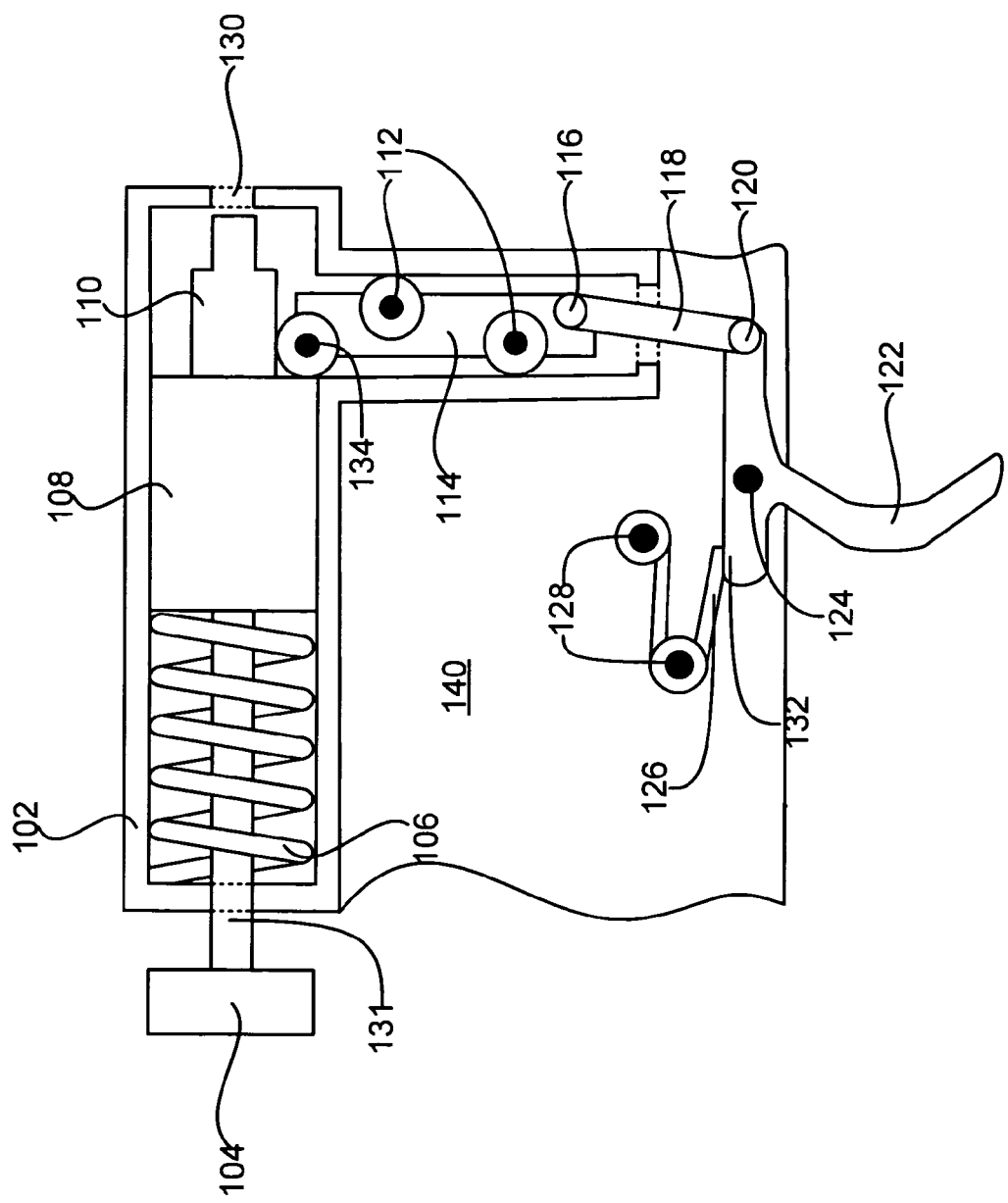
FIG. 2A shows a cross-sectional view of an embodiment of the first stage of a rolling trigger releasing the striker.

Trigger linkage pin 116 may be used to affix the trigger linkage to moving chassis assembly 114 in a way that allows rotational movement around trigger linkage pin 116. In an embodiment, trigger linkage 118 is a rigid linkage and may be used to provide a mechanical link between moving chassis assembly 114 and the trigger. Trigger linkage pin 116 may be used to affix the trigger linkage 118 to moving chassis assembly 114 in a way that allows rotational movement around trigger linkage pin 116. Trigger linkage pin 120 may be used to affix trigger linkage 118 to the trigger in a way to allow rotational movement around the connection point. Trigger 122 is a lever which may be used to actuate rolling trigger 100. Trigger linkage pin 120 may be used to affix trigger linkage 118 to the trigger 122 in a way to allow rotational movement around the connection point. Trigger pin 124 may be used as a pivot point around which trigger 122 rotates. Trigger spring 126 is a torsion spring is a mechanical bias which may be used to apply force to the trigger at contact point 132, causing (or biasing) trigger 122 to rotate forward and also to reposition the 100 trigger to the cocked position when the 104 cocking bolt is pulled back and forces 114 moving chassis assembly to reset as shown in FIG. 2A and 302. Spring pins 128 may be used to keep trigger spring 126 in a fixed position and to act as leverage points. Circular opening 130 is a circular opening in the front of enclosure 102 and may be used to provide striker 110 a space to pass through. Circular opening 131 is a circular opening in the rear of enclosure 102 and may be used to provide cocking bolt 104 a space to pass through. Contact point 132 is the point at which trigger spring 126 contacts and pushes on trigger 122. Rolling element 134 is a rolling ball bearing used to hold back the striker assembly. In an embodiment, rolling element 134 contacts piston 108 when moving chassis assembly 114 is at its highest position (or stated differently rolling element 134 contacts piston 108 when moving chassis assembly 114 is closest to striker 110).

In an embodiment, rolling trigger 100 is assembled within the enclosure 102, which is cylindrical with circular openings at both ends and a chamber extending from the bottom. Cocking bolt 104 passes through the rear circular opening 131 in enclosure 102, connecting to pin support 108. Within enclosure 102, and rearward of pin support 108 is main spring 106. When the trigger is locked in stage one, cocking bolt 104 pulled back, pulling pin support 108, compressing main spring 106. Forward of pin support 108 is the striker 110. Following stage two, the pin is pushed fully forward within enclosure 102, through the forward circular opening 130.

In an embodiment, the moving chassis assembly 114 is housed in the chamber in the bottom of enclosure 102. The moving chassis assembly 114 has bearings 112 between itself and the walls of the chamber to allow smoother and easier movement up and down. Rolling element 134 is a removable stop that holds pin support 118 in place prior to being released. Rolling element 134 (and any of the analogous rolling elements in any of the other embodiments of this specification) may be a sear, for example. The rolling element 134 is positioned on the rearward edge of moving chassis assembly 114 in such a way that when the rolling trigger 100 is in stage one, moving chassis 114 contacts pin support 108 locking trigger 122 in place.

In an embodiment, trigger 122 is connected to the moving chassis assembly 114 via trigger linkage 118. Trigger linkage 118 is affixed to trigger 122 by trigger linkage pin 120 and moving chassis assembly 114 by trigger linkage pin 116. The trigger linkage 118 is able to pivot freely on both trigger linkage pin 120 and trigger linkage pin 116. In an embodiment, trigger 122 pivots around trigger pin 124.

When rolling trigger 100 is moved into the first stage position, trigger spring 126 is held in place by spring pins 128, and pushes downward on trigger 122 at contact point 132. The downward pushing of spring 126 on trigger 122 causes the trigger 122 to rotate forward, pushing on trigger linkage 118 and moving chassis assembly 114 toward striker 110, causing rolling element 134 to contact pin support 108, holding trigger 122 in place.

In an embodiment, the rolling trigger 100 may contain a safety mechanism to prevent accidental discharge. The safety mechanism might work to keep the piston 108 from advancing and/or locking trigger 122 so that trigger 122 cannot be pulled or disconnect the trigger 122 from the trigger linkage 118, disabling trigger 122's ability to lower the moving chassis assembly 114. In an embodiment, rolling trigger 100 may be constructed of metal, plastic, or wood among other materials. In an embodiment, the rolling trigger 100 may be used in a firearm, air gun, spring gun, power tool, or any other device requiring a trigger.

In alternate embodiments, instead of (or in addition to) having trigger spring 126 applying force to trigger 122 in order to reset rolling trigger 100, a spring might also be located within enclosure 102 as to provide a mechanical bias directly to moving chassis assembly 114. Wall 140 may be a portion of the housing containing the rest of rolling trigger 100. Wall 140 may be connected to 102. Trigger pin 124 and spring pins 128 may be mounted on wall 140.

In an alternate embodiment, rolling trigger 100 has the capability of being semi or fully automatic. In an embodiment, the action of trigger mechanism 100 is cycled back to the cocked and ready position by the gas pressure provided by the previous round being discharged. In another embodiment, the action may be cycled back to the cocked and ready position by an electric motor or hand crank. In another embodiment, the action of rolling trigger 100 is cycled by the recoil of the gun as the previous round is released.

In an embodiment, rolling trigger 100 could be used in any application where the striker is an actuator for any purpose to move from a hold position to a released position to perform an action or function, such as but not limited to a circuit open and closed, a movement of a hammer or saw, a movement of a gear or wheel, etc.

FIG. 2A shows a cross-sectional view of an embodiment of the first stage of a rolling trigger releasing the striker. In an embodiment, trigger 100 is shown in the fully cocked position. In the fully cocked position, rolling element 134 holds back pin support 108 holding the entire mechanism of rolling trigger 100 stationary, awaiting for trigger 122 to be pulled.

FIG. 2B shows a cross-sectional view of an embodiment of the second stage of the firing of rolling trigger 100, releasing the piston 108. In an embodiment, as the trigger is pulled down, the center of rolling element 134 passes below the shear point between enclosure 102 and pin support 108. Having the center of rolling element 134 pass between enclosure 102 and pin support 108 allows pin support 108 to start rolling over the top of rolling element 134. The advantage of allowing pin support 108 to start rolling over the top of rolling element 134 is that a large amount of energy can be stored without the drawback of excessive friction against the sear or other removable stop.

Figure 2C:
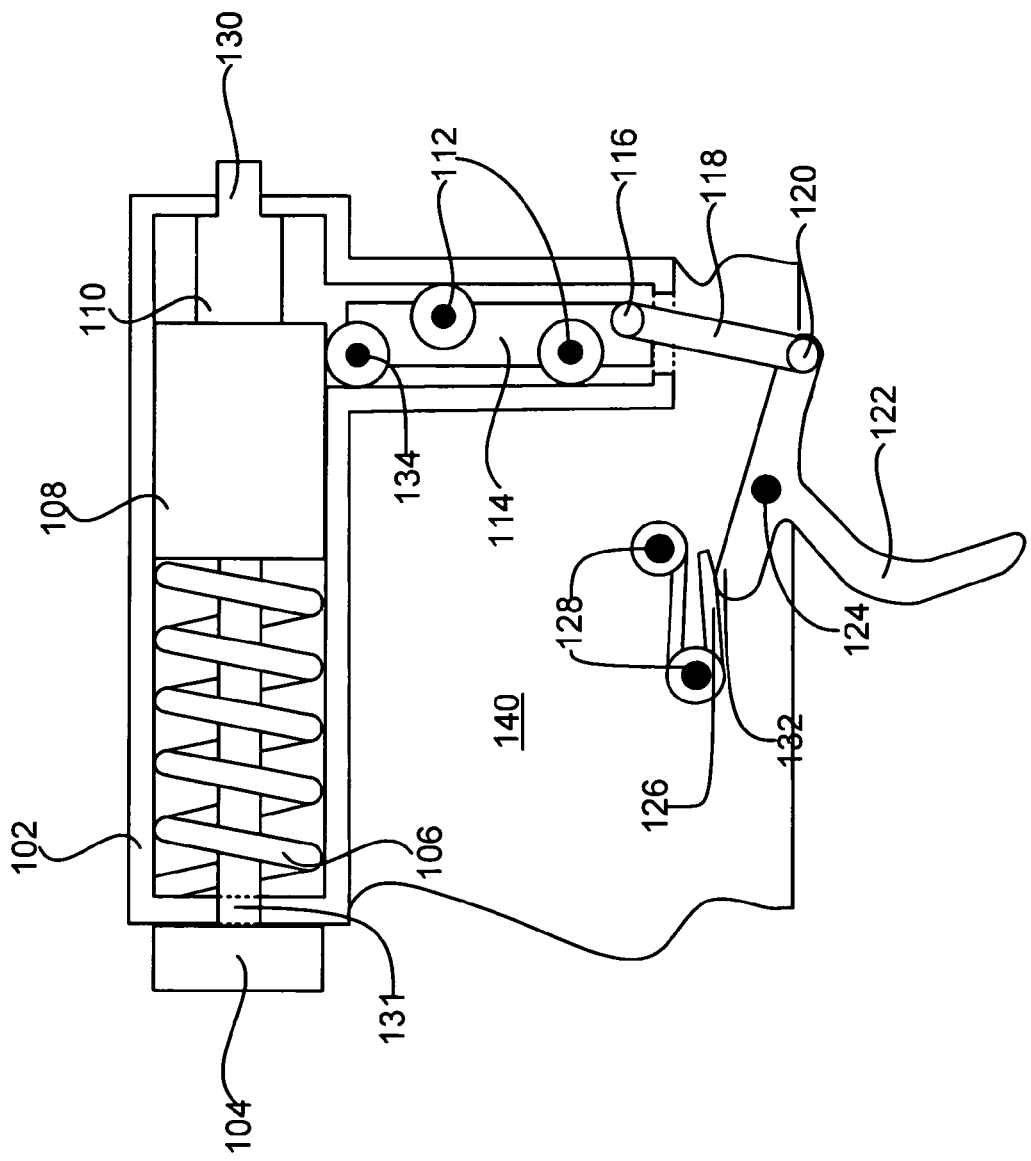
FIG. 2C shows a cross-sectional view of an embodiment of the third stage of a rolling trigger releasing the striker.

FIG. 2C shows a cross-sectional view of an embodiment of the third stage of a rolling trigger releasing the striker. In an embodiment, the combined force of trigger 122 pulling downward and pin support 108 rolling over rolling element 134, moving chassis assembly 114 all the way down (and away from striker 110), fully releases pin support 108 to move fully forward.

FIGS. 3A-D shows a cross-sectional view of an embodiment of the rolling element 134 releasing the striker. FIGS. 3A-D includes view of positions 302-308, respectively, of rolling element 134 and pin support 108, pin support 108, moving chassis assembly 114, rolling element 134, force 310 and force 312

In an embodiment, in position 302, when rolling trigger 100 is held in stage 1, rolling element 134 makes contact with pin support 108. The contact between rolling element 134 and pin support 108 is made in such a way that the center of rolling element 134 is above the shear point between piston 108 and enclosure 102. In an embodiment, in position 304, when moving chassis 114 is pulled downward (away from striker 110) by the shooter pulling the trigger 122 and trigger linkage 118, exerting the downward force 310, the center of rolling element 134 reaches the shearing point. In an embodiment position 304 is the start position of the rolling trigger mechanism 134. In an embodiment, in position 306, the center of rolling element 134 passes the shear point. In an embodiment, in position 308, the force 312 exerted on pin support 108 by main spring 106 causes pin support 108 to roll over the top of rolling element 134 and moving forward with striker 110 to the released position as shown in FIG. 2C, simultaneously pushing rolling element 134 downward and away from striker 110. The rolling trigger 100 can be cocked again in the locked position 302 in stage 1 by pulling cocking bolt 104 back over the center of rolling element 134 to allow moving chassis assembly 114 to be pushed upward by the shooter trigger 122 and trigger linkage 118 and trigger spring 126 to apply force to the trigger at contact point 132.

Figure 3A:
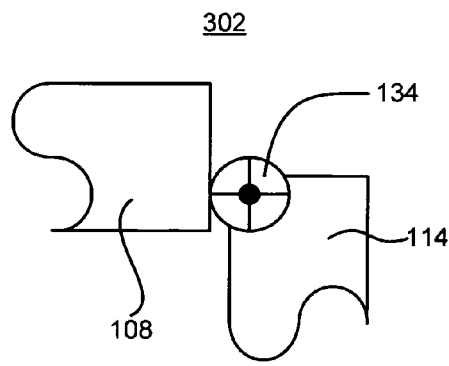
FIG. 3A-D shows a cross-sectional view of an embodiment of the rolling ball bearing releasing the striker.
Figure 3B:
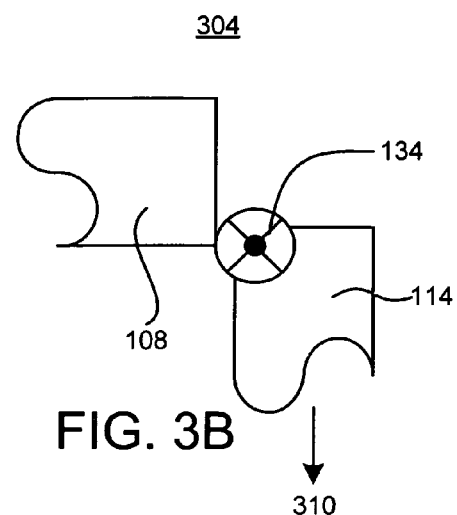
Figure 3C:
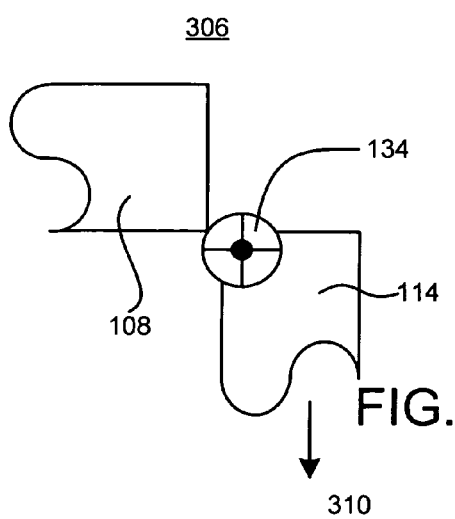
Figure 3D:
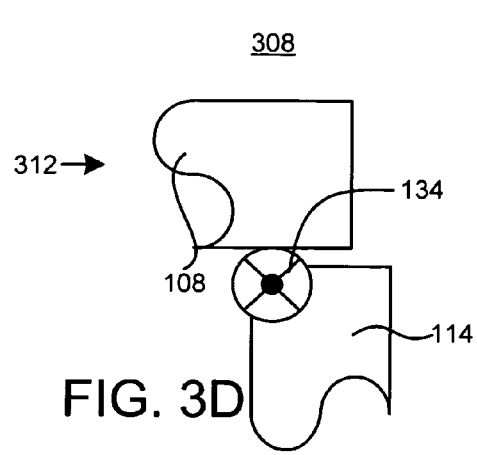
Figure 3E:
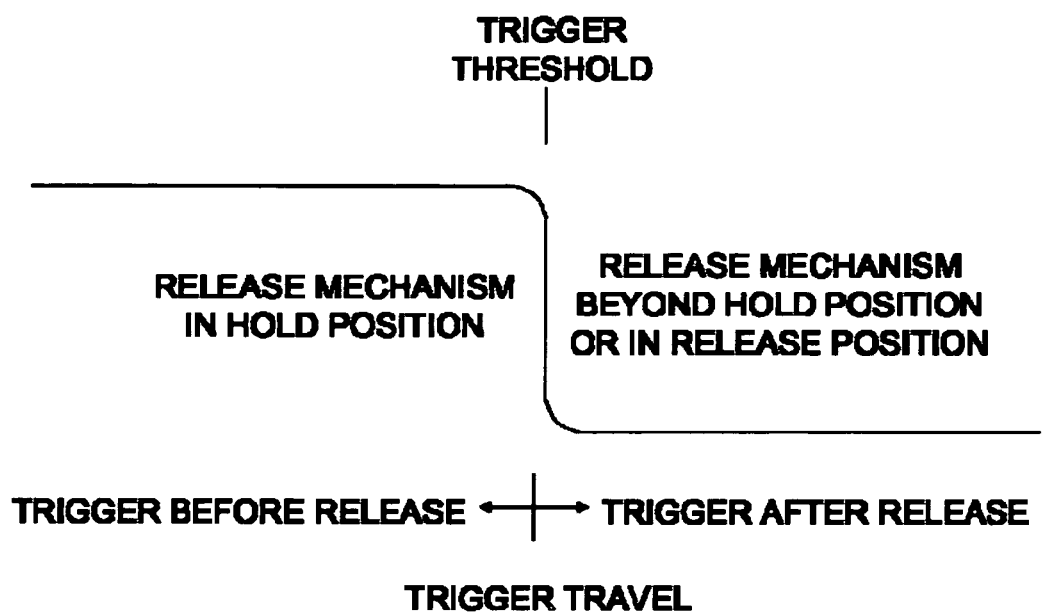
FIG. 3E shows an embodiment of a rolling trigger mechanism with an over-center bearing trigger trip threshold.

FIG. 3E shows an embodiment of a rolling trigger mechanism with an over-center bearing trigger trip threshold with a low-friction and a short-travel, which thus requires low energy while providing a smooth and constant resistance over the trigger travel, which is consistent with FIGS. 2A-D and 3B-D.

FIG. 3E shows a step function diagram representing what happens immediately before and immediately after the rolling element bearing (e.g., rolling element 134) physically passes through the center of the axis of the rolling element bearing and the edge of the piston (108). The center threshold may be called the over-center trigger threshold in the diagram along the horizontal axis as the trigger position travels between the holding or cocked position of the piston and the released or triggered position of the piston. The horizontal scale represents the rolling element's physical movement through center, before and after the trigger's threshold is crossed. The vertical scale represents the functional position of the piston before and after the trigger crosses the threshold as a result of the trigger bearing position, but is not a plot of the physical position in time. Therefore the vertical scale is the functional description of both sides of threshold, before and after the trigger releases the piston. When the plot line is in the high position, the piston is cocked, and when the plot line is in the low position the piston is released. This functional diagram is also described in FIG. 3E and in FIGS. 7A and 7B.

FIG. 4 shows a flowchart of an example of method 400 of using a rolling trigger. In an embodiment, in step 402, the user engages rolling trigger 100 by first pulling back (that is in the opposite direction of firing, which towards the cocked position) cocking bolt 104. In step 403, as a result of pulling back the cocking bolt 104, piston 108 and striker 110 are also pulled back. Additionally, as a result pin support 108 being pulled back, main spring 106 compresses. In step 404, the displacement of piston 108 frees the moving chassis assembly 114, allowing trigger spring 126 to rotate trigger 122 forward (in the same direction as firing). In step 405, trigger 122 rotates forward causing trigger linkage 118 and chassis assembly 114 to move upward toward striker 110. In step 406, At the top of the movement (that is the position closest to striker 110), rolling element 134 contacts pin support 108, holding rolling element 134 in position, which may be referred to as the cocked position. In step 407, the user then squeezes trigger 122, overpowering trigger spring 126, causing step 408, in which trigger 122 rotates backward. In step 409, the rotating backwards of trigger 122 pulls trigger linkage 118 downward (away from striker 110) and pulls moving chassis assembly 114 downward. In step 410, the downward movement of moving chassis assembly 114 causes rolling element 134 to roll downward (away from striker 110), breaking contact with piston 108. Steps 407-410 may be referred to as the release stage. In step 411, main spring 106 pushes piston 108 and striker 110 forward (in the direction of firing moving away from the cocked position). In step 412, piston 108 rolls over rolling element 134. In step 413, main spring 106 then releases the energy stored from being compressed and pushes striker 110 through circular opening 130 in the enclosure. Step 412 may be referred to as the firing stage. In step 414, the firing mechanism is either left in the released state or can be reset by pulling cocking bolt 104 back. In an embodiment, each of the steps of method 400 is a distinct step. In another embodiment, although depicted as distinct steps in FIG. 4, step 402-414 may not be distinct steps. In other embodiments, method 400 may not have all of the above steps and/or may have other steps in addition to or instead of those listed above. The steps of method 400 may be performed in another order. Subsets of the steps listed above as part of method 400 may be used to form their own method.

In other embodiments, the use of rolling trigger 100 may contain the above steps but is not limited to containing all of the steps, or containing steps not listed.

FIG. 5 shows a flowchart of an embodiment of method 500 of assembling rolling trigger 100. In step 501, the various components of the rolling trigger 100 are manufactured. For example, enclosure 102, cocking bolt 104, main spring 106, piston 108, striker 110, rolling bearings 112, moving chassis assembly 114, trigger linkage pin 116, trigger linkage 118, trigger linkage pin 120, trigger 122, trigger pin 124, trigger spring 126, spring pins 128 and rolling element 134 are manufactured. In step 502, rolling bearings 112 and rolling element 134 are inserted into moving chassis assembly 114. In step 503, striker 110 is affixed to piston 108 so that piston 108 and striker 110 are aligned down the center of enclosure 102. In step 504 the piston 108/striker 110 assembly is placed into enclosure 102 in the upper chamber with striker 110 facing forward. In step 505, main spring 106 is placed inside enclosure 102 to the rear of piston 108 on the opposite side of piston 108 that striker 110 is mounted. In step 506, cocking bolt 104 is passed through circular opening 131, through the center of main spring 106 and is affixed to piston 108. In an alternative embodiment, cocking bolt 104 and main spring 106 are attached to piston 108 prior to being inserted in enclosure 102. In step 507, moving chassis assembly 114 is placed inside enclosure 102 in the lower chamber with rolling element 134 facing rearward (towards the cocked position and away from the direction of firing). Moving chassis assembly 114 may be assembled and/or placed in enclosure 102 prior to after or simultaneously with attaching striker 110 to piston 108 and attaching piston 108 to cocking bolt 104 and main spring 106 and/or prior to step 506. In step 508, trigger linkage 118 is pivotally connected to moving chassis assembly 114 via linkage pin 116, so as to allow for the rotation of linkage 118 around linkage pin 116. In step 509, trigger linkage 118 is pivotally connected to trigger 122 via linkage pin 120, to as allow the rotation of linkage 118 and trigger 122 around linkage pin 120. In step 510, trigger 122 is pivotally connected to trigger pin 124, so that trigger 122 is free to rotate around trigger pin 124. Trigger pin 124 is rigidly attached to wall 140 of the housing and/or another structure fixed in location. In step 511, trigger spring 126 is affixed by spring pins 128 to hold spring 126 in a fixed position. Spring pins 126 are attached to wall 140 at a location with respect to trigger pin 124 such that one end of spring 126 makes contact with and pushes against trigger 122 (away from striker 110) at contact point 132, biasing trigger 122 to rotate into a cocked position, which pushes moving chassis assembly 114 into striker 110, blocking the firing/release of piston 108. In an embodiment, each of the steps of method 500 is a distinct step. In another embodiment, although depicted as distinct steps in FIG. 5, step 501-512 may not be distinct steps. In other embodiments, method 500 may not have all of the above steps and/or may have other steps in addition to or instead of those listed above. The steps of method 500 may be performed in another order. Subsets of the steps listed above as part of method 500 may be used to form their own method.

Figure 6:
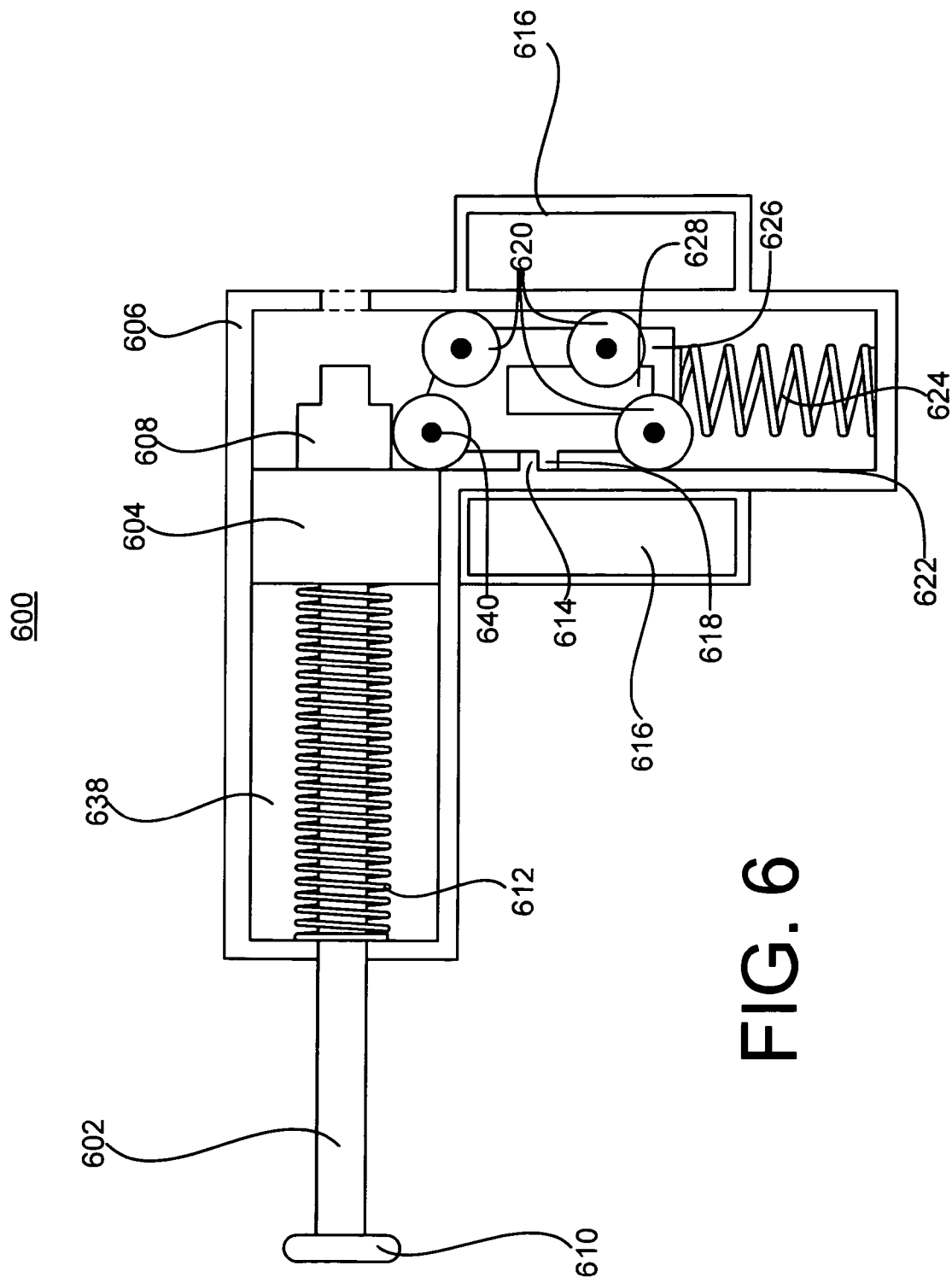
FIG. 6 shows a cross-sectional view of an embodiment of a mechanism using the rolling trigger.

FIG. 6 shows a cross-sectional view of an embodiment of a trigger mechanism using the rolling trigger. Trigger mechanism 600 is comprised of connecting shaft 602, support 604, body 606, striker 608, manual reset knob 610, push-spring 612, fixed travel stop 614, solenoid coil 616, moving travel stop 618, bearings 620, control housing 622, solenoid push-spring 624, moving chassis assembly 626, magnet 628, spring housing 638, and rolling element 640. In other embodiments, trigger mechanism 600 may not have all of the elements listed and/or may have other elements instead of, or in addition to, those listed.

Trigger mechanism 600 may be a device used to discharge a firearm or other device requiring a trigger mechanism. Connecting shaft 602 is a rod that may connect the striker to a support, push-spring, and a manual reset knob. The valve connecting shaft 602 may be used to manually reset trigger mechanism 600.

Support 604 may be used to ensure alignment of striker 608 and connecting shaft 602. In an embodiment, support 604 has an inner seal separating the spring housing from the rest of trigger mechanism 600.

Body 606 is an enclosure that may be used to contain and guide the inner structures of trigger mechanism 600. Striker 608 is the portion of trigger 600 that strikes a target (e.g., a projectile or powder charge). Striker 608 may include a circular seal which may help keep moisture out of trigger mechanism 600.

Reset knob 610 is a handle that may be used to manually pull back connecting rod 602. Push-spring 612 is a compression spring which may be used to push support 604, which could be referred to as a guide, because support 604 keeps striker 608 properly aligned within body 606, and striker 608 forward, causing striker 608 to strike a target. Fixed travel stop 614 may contact a moving travel stop, when in the cocked position, preventing the movement of the chassis assembly, which could be referred to as a rolling assembly or rolling element, towards striker 608.

Solenoid coil 616 may be a tightly packed metallic coil that may create an electro-magnetic field that pulls and/or pushes magnet on the chassis assembly, shifting moving chassis assembly, closer to, or further away from the striker, depending on the direction and/or the strength of the field.

Moving travel stop 618 may contact fixed travel stop 614, while in the cocked position, preventing the chassis assembly from moving closer towards the striker. Bearings 620 are bearings which may facilitate the movement of the moving chassis assembly within the control housing of the trigger assembly 600.

Control housing 622 is an enclosure connected to body 606, which may be used to contain the various components of the trigger assembly. Solenoid push-spring 624 is a compression spring that may push the moving chassis assembly towards the striker 608. In an embodiment, the magnetic field of solenoid coils 616, acting on the polarity of magnet 628, momentarily push the moving chassis assembly in one direction (against the force of solenoid push spring 624, thereby compressing solenoid push spring 624), and solenoid push spring 624 pushes the moving chassis assembly in the opposite direction (solenoid push-spring 624 is optional, because the solenoid may be used to move the moving chassis assembly in either direction by changing the direction of the magnetic field).

Moving chassis assembly 626 is a linkage, containing bearings 620 and an element that acts as a sear or removable stop, which may be contain a magnet. The element that acts as a sear may hold trigger mechanism 600 open when trigger mechanism 600 is in the cocked potion. Magnet 628 may be a permanent magnet which may push or pull on moving chassis assembly 626, when acted upon by an electro-magnetic field. In the current embodiment, striker 608 is shown as a circular, bolt, in other embodiments, striker 608 may be a spherical ball, a flat disk, or have other shapes. Spring housing 638 may be used to enclose push spring 612 and connecting rod 602. Rolling element 640 may be used to contact support 604 holding support 604 in position. Rolling element 640 functions as a sear for trigger 600.

In an embodiment trigger mechanism 600 is a trigger that utilizes a low-force rolling trigger to allow for smooth discharge and reset. In an embodiment, the trigger mechanism 600 may be connected to a tube for directing the travel of a projectile struck by striker 608. In other embodiments, the trigger mechanism 600 might have multiple states in which the trigger mechanism is cocked to different degrees (e.g, by moving chassis assembly 626—and therefore rolling element 640—being held in slightly different positions), each degree of cocking corresponding to a different amount of force that the striker applies to the target upon impact. The use of the low-force rolling trigger allows for smoother engagement of the striker 110.

In an embodiment trigger mechanism 600 could be used in any application where the striker is an actuator for any purpose to move from a hold position to a released position to perform an action or function, such as but not limited to a circuit open and closed, a movement of a hammer or saw, a movement of a gear or wheel, etc.

In an embodiment, trigger mechanism 600 could be made out of any mixture of metal, plastic, wood, ceramic and/or composite materials but is not limited to those materials. In an embodiment, all the materials used to construct trigger mechanism are non-magnetic as to not interfere with the magnetic field of the solenoid coils.

FIG. 7A shows a cross-sectional view of the first stage of the cycle of FIGS. 7A-7D of an embodiment of a trigger mechanism in which, during this cycle, the trigger mechanism is released and then reset (FIGS. 7B-7D show the second, third, and fourth stages, respectively of this cycle). In the first stage of the embodiment of FIGS. 7A-D, when moving chassis assembly 626 is at its highest position, which is the position closest to striker 608, the center of rolling element 640 is above the shear point between support 604 and body 606, holding back support 604, thereby holding the striker 608 in the cocked position.

FIG. 7B shows a cross-sectional view of the second stage of the cycle of FIGS. 7A-7D. In the second stage of the embodiment of FIGS. 7A-D, moving chassis assembly 626 has been moved further form the striker 608 by the magnetic field created by solenoid coil 616, which acts upon magnet 628. The magnetic field causes the center of rolling element 640 to move away from the striker 608 and away from the shear point between support 604 and body 606, allowing support 604 to roll over the top of rolling element 640.

FIG. 7C shows a cross-sectional view of the third stage of the cycle of FIGS. 7A-7D. In the third stage of the embodiment of FIGS. 7A-D, striker 608 is pushed fully forward to the furthest position possible in the direction of firing and away from the cocked position. In this position, in an embodiment, striker 608 contacts seat 632, creating a seal, closing off the chamber within body 606.

FIG. 7D shows a cross-sectional view of the fourth stage of the cycle of FIGS. 7A-7D. In the fourth stage of the embodiment of FIGS. 7A-D, as a result of the operator resetting trigger assembly 600 by pulling on manual reset knob 610 in the opposite direction as firing, as manual reset knob 610 is pulled back, support 604 rolls over the top of rolling element 640 allowing solenoid spring 624 to push moving chassis assembly 626 toward striker 608, holding support 604 in the cocked position.

FIG. 8 shows a flowchart of an example of method 800 of the operation of a trigger mechanism 600. In an embodiment, in step 802, an electrical pulse is sent to solenoid coil 616. In step 803, the electrical pulse causes solenoid coil 616 to momentarily increase the magnetic field around magnet 628. In step 804, magnet 628 acting within the magnetic field pushes down on the moving chassis assembly 626. In step 805, rolling element 640 breaks contact with support 604. In step 806, push spring 612 pushes support 604 and striker 608 forward, in the direction of firing away from the cocked position. In step 807, support 604 rolls over rolling element 640. In step 808, striker 608 makes contact with seating 632 creating a seal, closing the chamber within body 606 of trigger mechanism 600. In step 809, trigger mechanism 600 is reset by pulling on manual reset knob 610, which pulls back striker 608 to the cocked position. In an embodiment, each of the steps of method 800 is a distinct step. In another embodiment, although depicted as distinct steps in FIG. 8, step 802-809 may not be distinct steps. In other embodiments, method 800 may not have all of the above steps and/or may have other steps in addition to or instead of those listed above. The steps of method 800 may be performed in another order. Subsets of the steps listed above as part of method 800 may be used to form their own method.

Figure 9:
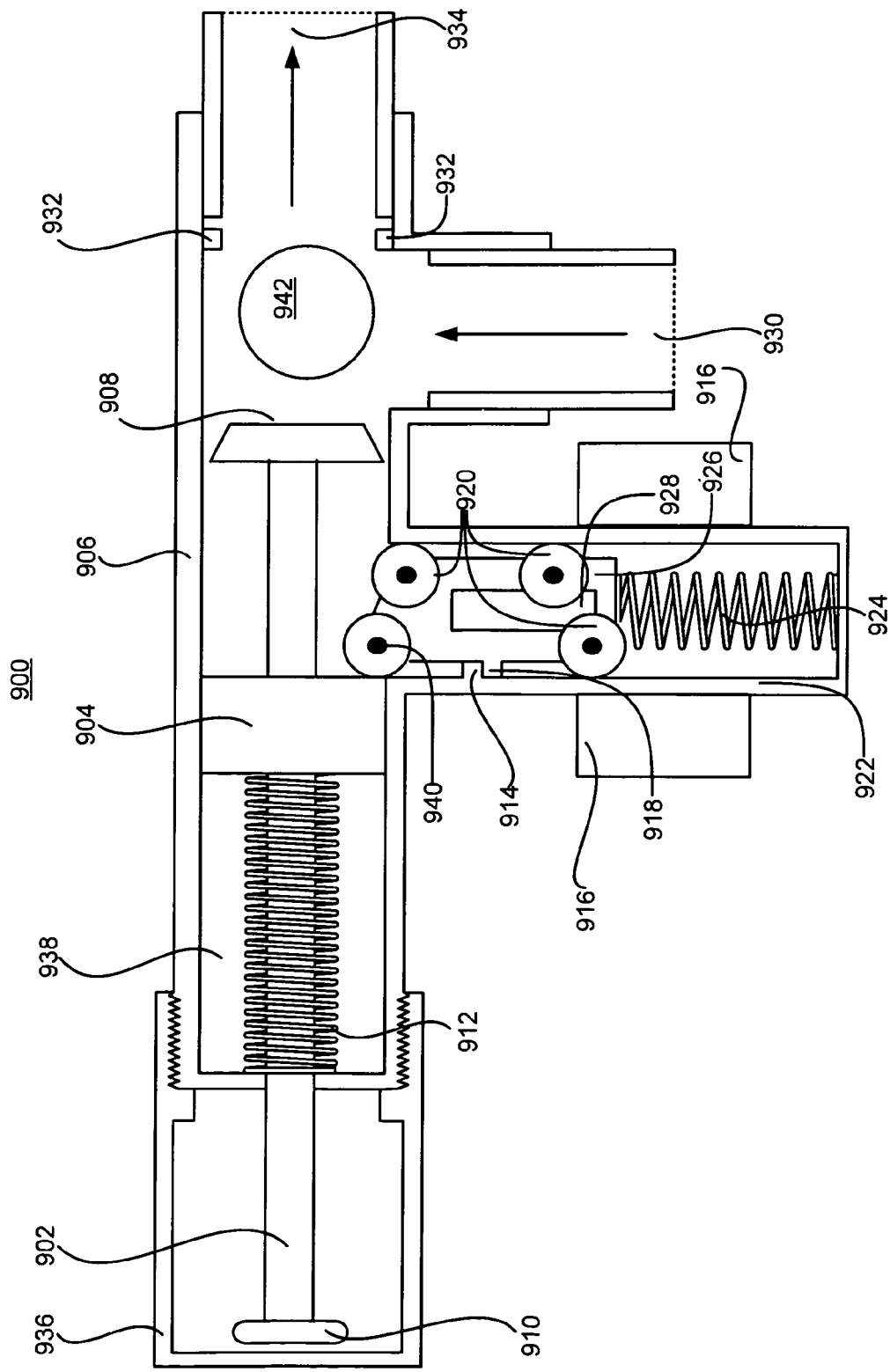
FIG. 9 shows a cross-sectional view of an embodiment of a rolling trigger mechanism.

FIG. 9 shows a cross-sectional view of an embodiment of trigger mechanism 900. Trigger 900 may include of a tube connecting shaft 902, support 904, body 906, striker head 908, manual reset knob 910, push-spring 912, fixed travel stop 914, solenoid coil 916, moving travel stop 918, bearings 920, control housing 922, solenoid push-spring 924, moving chassis assembly 926, magnet 928, loading tube 930, seat 932, barrel 934, end cap 936, spring housing 938, rolling element 940, and target 942. In other embodiments, trigger 900 may not have all of the elements listed and/or may have other elements instead of, or in addition to, those listed.

Trigger 900 may be a device used to control the flow of fluid or gas, may be used to launch a projectile or may be used for other purposes. Connecting shaft 902 is a rod which may connect striker head 908 to support 904, push-spring 912, and manual reset knob 910. The connecting shaft may be used to manually reset trigger 900. Support 904 may help ensure alignment of striker head 908. In an embodiment, support 904 has an inner seal separating spring housing 938 from the rest of trigger 900. Body 906 is an enclosure which may be used to contain and guide the inner mechanisms of trigger 900. Striker head 908 may be a disk shaped component positioned for striking a target. In other embodiments, striker head 908 may have other shapes, such as spherical. In an embodiment striker head 908 fits into a seat creating a seal. Reset knob 910 may be a handle that, upon being manually pulled towards the coked position, may be pull connecting rod 902 in the same direction. Push-spring 912 is a compression spring that may push support 904 and striker head 908 forward, causing striker head 908 to contact the seat, striking a target that was initially in front of striker head 908 sending the target through the barrel. Fixed travel stop 914 may contact moving travel stop 918 preventing moving chassis assembly from moving further towards striker head 908. Solenoid coil 916 may be a tightly packed metallic coil that may create an electro-magnetic field that acts upon a magnet, shifting moving chassis assembly toward or away from striker head 908, depending on the strength and/or direction of the field. Moving travel stop 918 may contact fixed travel stop 914, preventing the moving chassis assembly from moving closer to striker head 908. Bearings 920 are bearings which may facilitate the movement of the moving chassis assembly within control housing 922. Control housing 922 is an enclosure connected to body 906, which may be used to contain the various components of the trigger assembly 900. Solenoid push-spring 924 is a compression spring that may be used to push the moving chassis assembly upward. Moving chassis assembly 926 is a linkage, containing bearings 920 and a rolling element that acts as a removable stop for support 904. Moving chassis assembly 926 may contain a magnet and the top most bearing (the rolling element) that holds trigger 900 cocked. Magnet 928 is a permanent magnet which may be used to push downward on moving chassis assembly 926, when acted upon by an electro-magnetic field.

In an embodiment, after being released, trigger 900 is pushed to the cocked position by compression spring 928. After being cocked (as a result of turning off solenoid coil 928), magnet 928 is above the center of the solenoid coil 916 and the direction of magnet 928 and the direction of the current are chosen so that when solenoid coil 916 is activated, solenoid coil 916 and magnet 928 will attract one another, and solenoid coil 916 will pull magnet 928 to the center of solenoid coil 916. In an alternative embodiment, the orientation of pull magnet 928 and the direction of current in solenoid coil 916 is chosen so that solenoid coil 916 could be located higher up. To fire trigger 900, magnet 916 could be pushed below the center of solenoid coil 916 by a magnetic field that repels magnet 928, and then to cock trigger mechanism 900, to hold striker head 908 in place, the magnetic field is turned off. In either configuration activating solenoid 916, releases trigger mechanism 900.

Loading tube 930 may be used for loading ammunition or other targets into a location where striker head 908 will strike upon firing. Loading tube may serve as an air intake during firing, so that a vacuum is not created behind striker head 908 (on the side of striker head 908 that is closer to reset knob 910, because the vacuum could hinder the firing of striker head 908. Although in FIG. 9 loading tube 930 is located on the same side as moving chassis 926, in other embodiments loading tube 930 may be located elsewhere, such as on the opposite side of trigger assembly 900 as moving chassis assembly 926. Seat 932 may act as a stop preventing striker head 908 form traveling beyond a desired point. Seat 932 may be circular and may create a seal when contacted by striker head 908 and while striker head 908 is pushed against seat 932 by push-spring 912. Seat 932 is optional. Barrel 934 guides the target after being set in motion by the strike of striker head 908. End cap 936 may enclose connecting rod 902 and reset knob 910 for protection when trigger assembly 900 is not in use. End cap 936 may include threading or detents so that end cap 936 screws or snaps onto trigger assembly 900. Spring housing 938 may enclose and thereby protect push-spring 912 and connecting rod 902 from debris. Spring housing 938 may include threading or detents for engaging end cap 936. Rolling element 940 may contact support 904 holding support 904 in position when trigger assembly is in a cocked position. Rolling element 940 may be one of the bearings on moving chassis assembly 926. Target 942 is the item that is struck by striker 908. Target 42 may be a projectile, such as a pellet or ball. Target 942 is optional. For example, target 942 may be replaced with another object that is struck by striker 908 for other reasons.

In an embodiment trigger 900 utilizes a low-force rolling trigger mechanism to allow for smooth discharge and reset. In other embodiments, the might have multiple states. The use of the low-force rolling trigger mechanism allows for smoother engagement of trigger 900.

In an embodiment, trigger 900 may be used for striking a target, such as a projectile or actuator. In another embodiment, trigger 900 may be a valve and may regulate a fluid, such as air or gas but is not limited to either of these mediums.

In an embodiment, trigger 900 could be made out of metal, plastic, composite materials but is not limited to these materials. In an embodiment, loading tube 930 and barrel 934 have a circular cross section, but in other embodiments they may have other shaped cross sections. Although only the embodiment of FIG. 9 has loading tube 930, stops, barrel 934, and end cap 936, any of the embodiments of this specification may include any combination of these features. Magnet 928 as well as any of the magnets of this specification may be replaced with a ferromagnetic material positioned in such a way that the electromagnet solenoid coil 916 moves the chassis assembly 926, as described herein.

Figure 10:
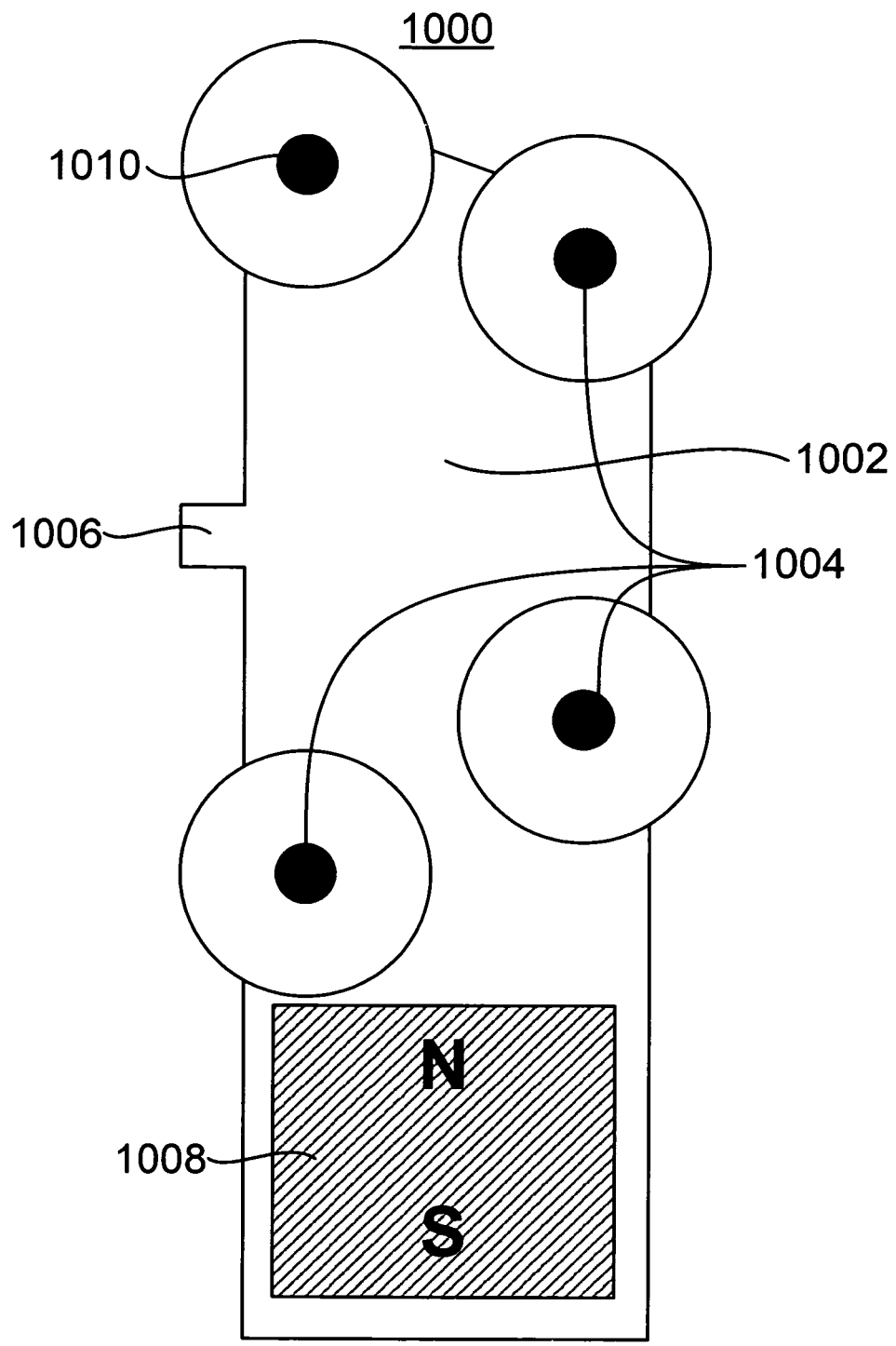
FIG. 10 shows an alternate embodiment of a moving chassis assembly.

FIG. 10 shows an alternate embodiment of a moving chassis assembly 1000. Moving chassis assembly 1000 may be made up of assembly body 1002, bearings 1004, moving travel stop 1006, bias magnet 1008 and rolling element 1010.

In the alternative embodiment of FIG. 10, bias magnet 1008 is located in the base of moving chassis assembly 1000.

In alternative embodiments, the orientation of the magnetic poles of bias magnet 1008 could be different from those depicted in FIG. 10. In other embodiments, there may be a different number of bearings 1004, placed in different positions along moving chassis assembly 1000. In other embodiments, moving travel stop 1006 may be absent or in another location along moving chassis assembly 1000. In other embodiments, rolling element 1010 may be in a different position on moving chassis assembly 1000, or may be a different shape. In another embodiment, the bias magnet 1008 may be replaced with a ferromagnetic material positioned in such a way that solenoid coil 916 may move the chassis assembly 1000 as described in connection with FIG. 9 and moving chassis assembly 926.

Figure 11:
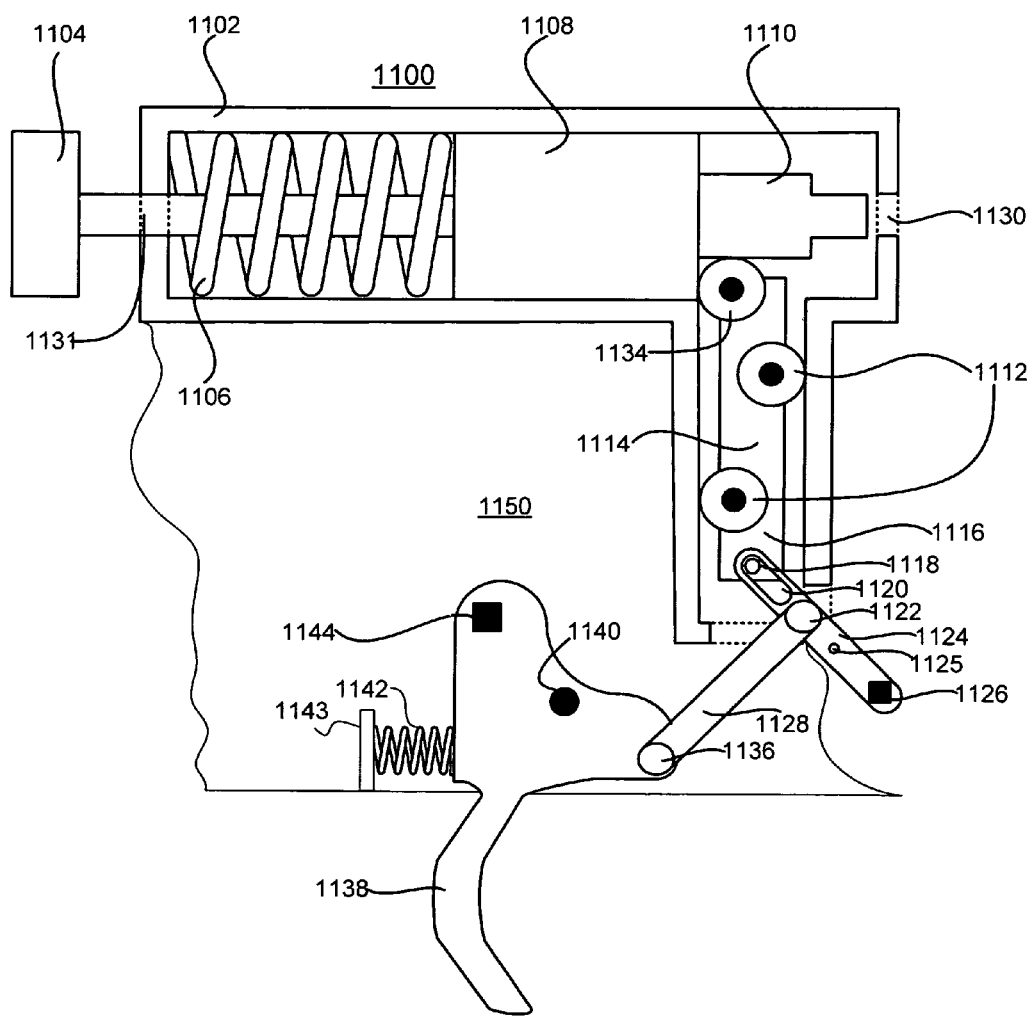
FIG. 11 shows an alternate embodiment of rolling trigger.

FIG. 11 shows a cross-sectional view of an embodiment of the rolling trigger mechanism. In rolling trigger 1100, parts 1102 through 1116 correspond to the names and functions of those parts, 102-116, discussed in FIG. 1. In an embodiment rolling trigger 1100 is made up of parts 1102-1116, channel pin 1118, channel guide 1120, link pin 1122, lever 1124, pivot 1125, counter weight 1126, link 1128, link pin 1136, trigger 1138, trigger pin 1140, trigger spring 1142, wall 1143, counterweight 1144, and wall 1150. In other embodiments, rolling trigger 1100 may not have all of the components listed and/or may have other elements instead of, or in addition to, those listed above.

Channel pin 1118 connects link 1128 to the moving chassis assembly 1114 by fitting into channel guide 1120. Channel guide 1120 allows lever 1124 to rotate and pull or push channel pin 1118 in a straight line while lever 1124 rotates. Link pin 1136 connects lever 1124 and link 1128 allowing lever 1124 and 1128 to move rotationally in respect to each other, lever 1124 rotating on pivot 1125. Counter weights 1126 and 1144 are placed in such a way to mitigate false trigger pulls from physical vibration and shock in various directions. Counter weights 1126 and 1144 tend to cause trigger 1138 to rotate in the counter-clockwise direction in the embodiment of FIG. 11. Link 1128 provides and mechanical connection between trigger 1138 and lever 1124. Link pin 1136 connects link 1128 and trigger 1138 allowing link 1128 and trigger 1138 to move rotationally with respect to each other. Trigger pin 1140 connects to trigger 1138, providing a point around which link 1138 rotates. Trigger compression spring 1142 provides a mechanical bias which serves to reset trigger mechanism 1100 after it has cycled, pulling trigger 1138 in the counter clockwise direction of the embodiment of FIG. 11, working against counter weights 1126 and 1144. Counter weight 1144 also provides a more solid trigger feel.

In an embodiment, as trigger 1138 is pulled, trigger 1138 rotates clockwise around trigger pin 1140, and link 1128 is pulled in the direction of the link pin 1136 as link pin 1136 rotates with trigger 1138. As a result of link 1128 moving with trigger 1138, link pin 1122 pulls on lever 1124 causing lever 1124 to rotate counter-clockwise in the opposite direction as trigger 1138. The rotating of lever 1124 in the opposite direction of trigger 1138 causes channel pin 1118 to pull chassis assembly 1114 towards lever 1124. As rolling chassis assembly 1114 moves, rolling element 1134 moves beyond the shear point between pin support 1108 and enclosure 102, allowing main spring 1106 to move striker 1110.

In an embodiment, as rolling trigger 1100 is cycled back into the cocked and ready position with manual reset knob 910, trigger spring 1142 applies a mechanical bias to trigger 1138, causing all of the components of trigger mechanism 1100 to return to their original positions per the connections and mechanical relationships described above. Wall 1143 anchors trigger spring 1142. Trigger spring pushes against wall 1143.

In an embodiment, counterweights 1126 and 1144 are positioned in such a way to provide stability to the trigger mechanism against vibration or other physical shocks that might cause a false trigger. Wall 1150 may be a portion of the housing containing the rest of rolling trigger 1100. Wall 1150 may be connected to 1102. Trigger pin 1140 and wall 1143 may be mounted on wall 1150.

Figure 12:
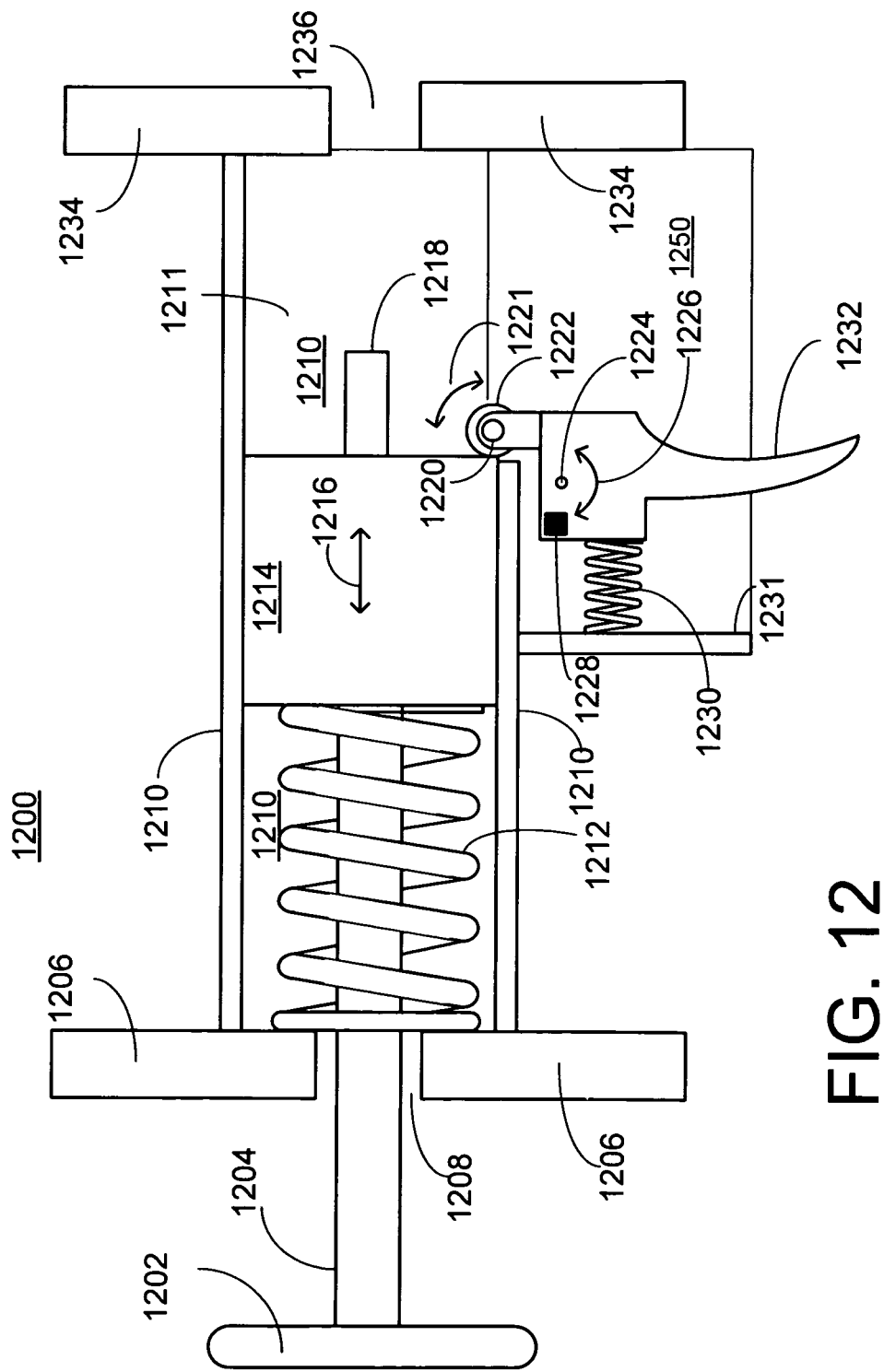
FIG. 12 shows an embodiment of a trigger mechanism.

FIG. 12 shows an embodiment of a trigger mechanism 1200. Trigger mechanism 1200 may include handle 1202, shaft 1204, wall 1206, hole 1208, channel wall 1210, channel 1211, compression spring 1212, piston 1214, direction of travel 1216, striker 1218, axle 1220, direction of travel 1221, roller 1222, pivot 1224, direction of travel 1226, counter balance 1228, compression spring 1230, trigger 1232, stop 1234, hole 1236, and wall 1250. In other embodiments, trigger mechanism 1200 may not necessarily contain all of the components listed and/or may include other components in addition to or instead of those listed above.

Trigger mechanism 1200 has a roller attached directly to a portion of the trigger that holds the piston of the striker in the cocked position. Handle 1202 may be a disc shaped portion attached to the end of a shaft of a piston on which the striker is mounted. In other embodiments, handle 1202 may have another shape that is easy to grab with fingers or any other shape (e.g., spherical, ellipsoidal, cylindrical, rectangular, or another shape).

Shaft 1204 attaches handle 1202 to the piston on which the striker sits. Shaft 1204 is at least as long as the maximum distance of travel of the striker.

Wall 1206 forms one end of a chamber in which the striker travels. Wall 1206 may prevent the piston on which the striker is mounted form leaving the chamber holding the striker. Wall 1206 may support a compression spring that pushes the piston to which the striker is mounted in the direction that the striker travels when released.

Hole 1208 is a hole in wall 1206 and is a hole the chamber formed by the wall and the channel that guides the piston on which the striker sits. Shaft 1204 protrudes from inside the chamber through hole 1208.

Channel wall 1210 forms a channel in which the piston holding the striker rests. Channel wall 1210 guides the piston to ensure that the striker travels in a straight path when fired. Channel wall 1210 is attached to wall 1206 and together with another wall at the other end of channel wall 1210 form the chamber in which the striker is fired and travels. Channel 1211 is the channel formed by channel wall 1210.

Compression spring 1212 is mounted on wall 1206 and attached to the piston holding the striker. Compression pin 1212 is mechanically biased to push the piston and striker in the direction of firing. When the trigger mechanism 1200 is in a cocked position, compression spring 1212 is in a compressed state. When the piston that holds the striker is released, compression spring 1212 decompresses causing the piston and striker to fire.

Piston 1214 has the striker mounted on one face and has compression spring 1212 attached to the other face. Piston 1214 may also be referred to as a piston. When compression spring 1212 decompresses, compression spring pushes against channel wall 1210 and pushes firing piston 1214 away from wall 1210, causing piston 1214 to move in the the firing direction, and when trigger mechanism 1200 is cocked piston 1214 is pushed towards wall 1210 compresses compression-spring 1210.

Direction of travel 1216, represented by a double headed arrow indicates the two directions that the piston 1214 and striker travel when being fired and cocked respectively. Striker 1218 is a striker that strikes an object when triggering mechanism 1200 is fired, causing the object to move in the direction of travel as striker 1218. Axle 1220 is the axle of a roller that holds piston 1214 in place when triggering mechanism 1200 is in the cocked position. Direction of travel 1221 is an arrow representing the direction of travel of the roller in releasing piston 1214 and cocking trigger mechanism 1200. Roller 1222 sits on axle 1220. Roller 1222 contacts piston 1214 when piston 1214 is in the cocked position. When the trigger is pulled, as piston 1214 is released, piston 1214 rolls off the trigger by rolling off of roller 1222 instead of sliding off the trigger. Since piston 1214 rolls of the trigger there is less friction and hindrance to the piston 1214 moving towards the released position. Pivot 1224 supports the trigger and the trigger rotates on pivot 1224 when pulled and released. Direction of travel 1226 is the direction in which the trigger rotates about pivot 1224.

Counter balance 1228 creates a torque on the trigger pushing the trigger to rotate into piston 1214 pushing roller 1222 into contact with piston 1214. The torque created by counter balance 1228 pushes the trigger to rotate in the opposite direction that compression spring 1212 pushes on the trigger to rotate, which also pushes piston 1214 in the opposite direction as compression spring 1212. Counter balance 1228 helps ensure that the trigger is not inadvertently released as result of the entire assembly being shaken during normal handling or if dropped, for example.

Compression spring 1230 pushes the trigger in the same direction as counter balance 1228, increasing the effective spring constant of the combination of compression spring 1212 and compression spring 1230 compared to the what the spring constant is for compression spring 1212, which is what the effective spring constant would be were compression spring 1230 not present. By having compression spring 1212 and 1230 work against each other, there is more resistance to trigger 1224 moving, making it less likely of the trigger to release inadvertently. The combination of compression spring 1230 and counter balance 1228 overpower compression spring 1212 so that piston 1214 is not released until the trigger is pulled.

Wall 1231 provides an anchor point for compression spring 1230. Compression spring 1230 is attached at one end to wall 1231. Compression spring 1230 pushes against wall 1231 while compressing and decompressing so that the other end of compression spring 1230 moves towards and away from wall 1231 while compressing and decompression.

Trigger 1232 rotates on pivot 1224 when pulled and when the trigger mechanism 1200 is cocked. In pulling trigger 1232, trigger 1232 is aided by compression spring 1212 in pushing against compression spring 1230 and against the weight of counter balance 1228. If pulled with enough force to overpower the net torque of the combination of compression spring 1214, counter balance 1228, and compression spring 1230, piston 1214 is released and trigger mechanism 1200 fires.

Stop 1234 is wall that stops piston 1214 from traveling beyond a particular distance (limiting the range of travel of piston 1214), keeping shaft 1208, piston 1214, and striker 1218 from leaving the triggering mechanism 1200. Optionally, handle 1202, and wall 1206 may further aid in keeping shaft 1208, piston 1214, and striker 1218 from leaving the triggering mechanism 1200. Alternatively, handle 1202, and wall 1206 may be used instead of stop 1234 to keep shaft 1208, piston 1214, and striker 1218 from leaving the triggering mechanism 1200.

Hole 1236 is a hole in stop 1234 through which striker 1218 passes through, jutting out through the side of stop 1234 that faces away from piston 1214. After being released, striker 1218 travels on piston 1214 through holes 1238 to strike an object. Wall 1250 supports pivot 1224 and wall 1231, which in turn supports trigger 1232. Wall 1250 may be a portion of the housing of trigger mechanism 1200 and/or may be connected to channel wall 1210. Wall 1250 holds trigger 1232 in a position so as to cooperate with piston 1214.

Figure 13:
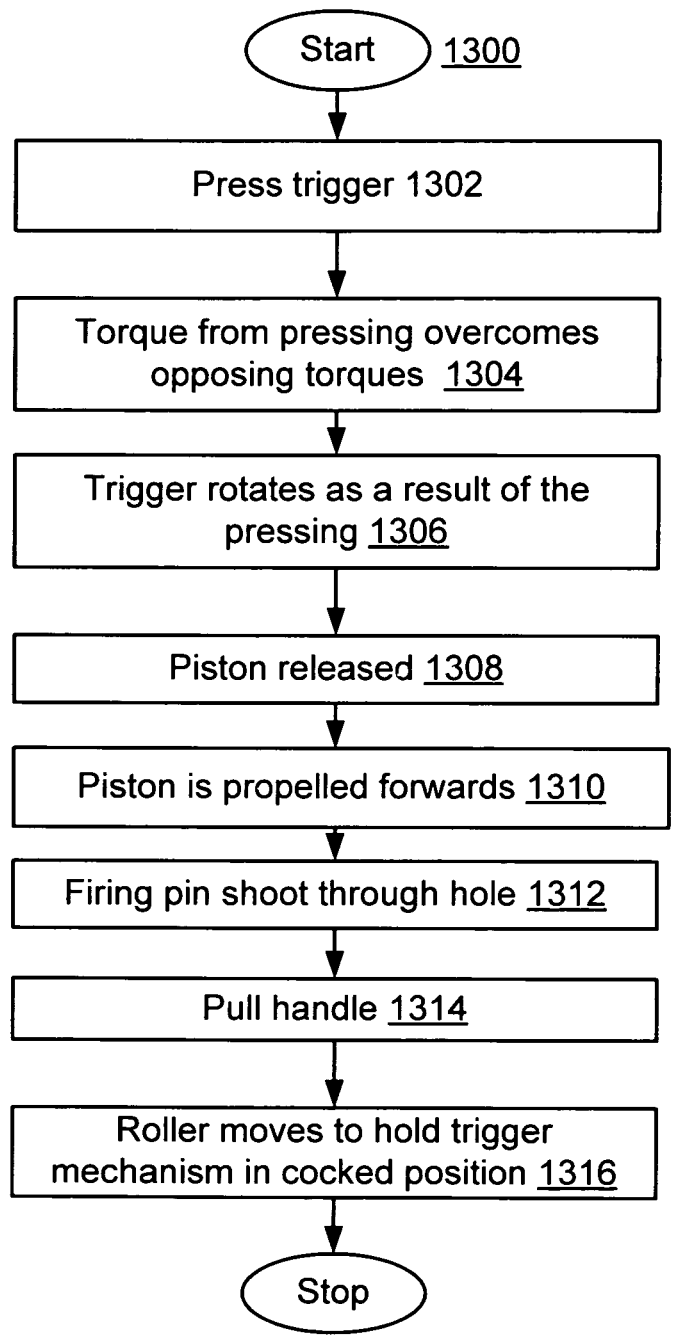
FIG. 13 is a flowchart of an embodiment of a method of using the trigger assembly of FIG. 12.

FIG. 13 is a flowchart of an embodiment of a method 1300 of using trigger mechanism 1200. In step 1302, the user presses on trigger 1232 with enough forces to move trigger 1232.

As a result, in step 1304 trigger 1232 presses against the force/torque created by counter weight 1228 and compression spring 1230, but aided by compression spring 1212 with enough torque to overcome the net torque resulting from compression spring 1212, counter weight 1228, and compression spring 1230.

In step 1306, as a result of step 1304, trigger 1232 rotates on pivot 1224 in a clockwise direction (in the embodiment of FIG. 12), compressing compression-spring 1230 and raising up counter weight 1228.

In step 1308, as a result of trigger 1232 rotating, roller 1222 also rotates in a clockwise direction, releasing piston 1214, allowing piston 12140 to roll off roller 1222.

In step 1310, as are result of being released, propelled by the decompression of compression spring 1212, piston 1214 flies in the direction of stop 1234, carrying striker 1218.

In step 1312, as a result of being pushed by compression spring 1212, striker 1218 shoots through hole 1236 striking a target on the side from which striker 1218 exist hole 1236, and optionally piston 1214 is stopped by stop 1234.

In step 1314, to cock trigger mechanism 1200, the user pulls on handle 1202, which in turn pulls on shaft, which pulls piston 1214 and striker 1218 towards wall 1206, decompressing compression spring 1212. During step 1314, roller 1222 is pressed by against counter balance 1228 and compression spring 1230 against piston (unless the user continues to depress trigger 1232).

In step 1316, the user pulls further on handle 1202, roller 1222 passes edge of piston 1214 that has the face that faces stop 1234. Compression spring 1230 and counter weight 1228 push roller 1222 further upward and in front of the face of piston 1214 that faces stop 1234, holding piston 1214 into the cocked position.

Figure 14:
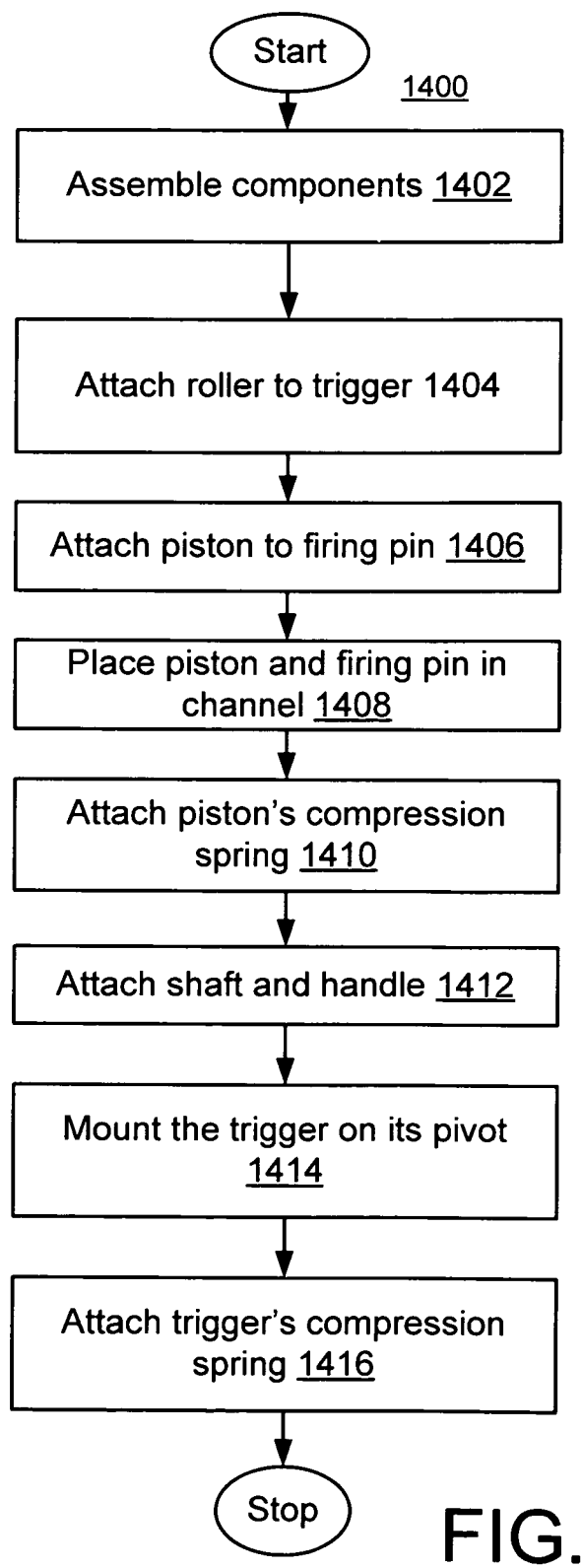
FIG. 14 is a flowchart of an embodiment of a method making the trigger mechanism of FIG. 12.

FIG. 14 shows a flowchart of an embodiment of method 1400 of assembling trigger mechanism 1200. In step 1402, the various components of trigger assembly 1200 are manufactured. For example, handle 1202, shaft 1204, wall 1206, hole 1208, channel wall 1210, channel 1211, compression spring 1212, piston 1214, striker 1218, axle 1220, direction of travel 1221, roller 1222, pivot 1224, counter balance 1228, compression spring 1230, trigger 1232, and stop 1234 are manufactured.

In step 1404, roller 1222 and axle 1220 are attached to trigger 1232. In step 1406, striker 1218 is affixed to piston 1214 so that piston 1214 and striker 1218 move together, and striker 1218 is aligned with hole 1208. Alternatively, the striker 1218 and piston 1214 may be molded as one piece.

In step 1408 the piston 1214/striker 1218 are placed into channel 1211. In step 1408, compression spring 1212 is placed inside channel 1211 on the opposite side of piston 1214 as the striker 1218 with the striker aligned with hole 1236. In step 1408, shaft 1204 is passed through hole 1208, through the center of compression spring 1212, and is affixed to firing piston 1214.

In step 1410, compression spring 1212 is inserted between and attached to wall 1206 and piston 1214. In an alternative embodiment, shaft 1204 may be attached and and/or compression spring 1210 may placed on shaft 1204 prior to piston 1214 being inserted in channel 1211 by leaving an opening in one side of hole 1208 that is closed after pivot 1214 is inserted into channel 1211 or by waiting to attach handle 1202 until after pivot 1214 is inserted in channel 1211. In an embodiment, after everything else is assembled the housing may be closed.

In step 1412, shaft 1204 is attached to handle 1202, inserted through compression spring 1212, and attach to piston 1214.

In step 1414, trigger 1232 is mounted on pivot 1224 and counter weight 1228 is mounted on or inserted within trigger 1232.

In step 1416, compression spring 1230 is attached to wall 1231 and trigger 1232. Wall 1231 and pivot 1244 may be part of the molding of the housing or may be attached before the steps in which wall 1231 and pivot 1244 are used for mounting compression spring 1231 and trigger 1232.

In an embodiment, each of the steps of method 1400 is a distinct step. In another embodiment, although depicted as distinct steps in FIG. 14, step 1402-1412 may not be distinct steps. In other embodiments, method 1400 may not have all of the above steps and/or may have other steps in addition to or instead of those listed above. The steps of method 1400 may be performed in another order. Subsets of the steps listed above as part of method 1400 may be used to form their own method.

Figure 15:
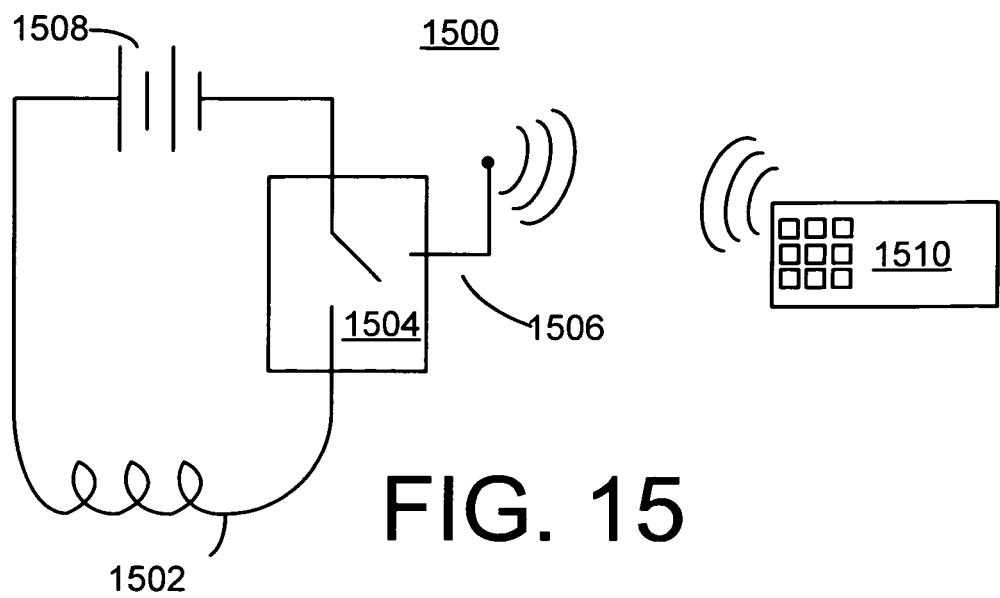
FIG. 15 shows a diagram of an embodiment of a circuit for controlling the solenoids of the embodiments of FIGS. 1-14.

FIG. 15 shows a diagram of an embodiment of a circuit 1500 for controlling the solenoids discussed above, which may include solenoid 1502, switch 1504 having antenna 1506, power supply 1508 and remote control 1510 having control pad 1512. In other embodiments, circuit 1500 may not necessarily contain all of the components listed and/or may include other components in addition to or instead of those listed above.

Circuit 1500 may be used to control any of the solenoids of this specification. Solenoid 1502 may be any of the solenoids discussed above. Switch 1504 may be remotely controlled, and may complete a circuit that causes current to flow from a power supply through the solenoid and then return to the power supply. Antenna 1506 may receive signals that activate switch 1504, causing switch 1504 to close the circuit. Power supply 1508 powers solenoid 1502. Optionally, power supply 1508 may also power switch 1504, via another circuit, so that switch 1504 can respond to signals while the circuit including solenoid 1504 is open. Remote control 15010 sends signals to switch 1504 causing switch 1504 to close and/or open. Control pad 1512 may be a user interface via which the user may enter commands to send to switch 1504. Although 9 button are shown in FIG. 15, there may be fewer or more buttons on control pad 1512. For example, control pad 1512 may only include one button, which when pressed causes switch 1504 to close the circuit. In other embodiments, remote control 1510 may be able to send more complex signals for patterns of opening or closing switch 1504. In other embodiments switch 1504 may be replaced with a controller capable of performing more complex tasks other than just opening or closing a circuit, such as changing the direction of the current in order to change whether the solenoid attracts or repels the magnet or ferromagnetic material on the rolling trigger.

In this specification the striker may be a firing pin. The rolling elements may be sears. The pistons may be supports for strikers or firing pins, and the supports supporting the strikers may be pistons or actuator assemblies. Any of the above embodiments may be used for clutches, brakes, other actuators, and/or for launching a projectile, for example.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A device comprising
   a trigger having a place for resting a finger while pushing on the trigger, the trigger being movably mounted;
   a roller mounted towards one edge of the trigger;
   a counter weight mounted towards an opposite edge of the trigger;
   a guide having one or more pieces running along different portions of a striker assembly, engaging the striker assembly holding the striker assembly to the guide, guiding the striker assembly to move along a desired path;
   a spring attached to the trigger, the spring and the counter weight pushing the trigger to move in a direction that is opposite a direction in which the trigger is pulled, the counter weight pushing the roller into a path of travel of the striker assembly, preventing the striker assembly from traveling when the device is in a cocked state.

2. The device of claim 1, further comprising a pivot on which the trigger is mounted; the direction in which the trigger is pulled being a rotation about the pivot in the direction that the trigger is pulled, and the direction that is opposite the direction that the trigger is pulled being a rotation in that is opposite the direction of rotation when the trigger is pulled.

3. The device of claim 1, the striker assembly being mechanically biased to push against the roller when in the hold position.

4. A device comprising
   a trigger having a place for resting a finger while pushing on the trigger, the trigger being movably mounted;
   a roller mounted towards one edge of the trigger;
   a counter weight mounted towards an edge that is opposite the edge of the trigger towards which the roller is mounted;
   a guide having one or more pieces running along different portions of a striker assembly, the guide engaging the striker assembly holding the striker assembly to the guide, the guide guiding the striker assembly to move in one direction along a desired path, all of the striker assembly moves together in the desired direction;
   a spring attached to the trigger, the spring and the counter weight pushing the trigger to move in a direction that is opposite a direction in which the trigger is pulled, the counter weight pushing the roller into a path of travel of the striker assembly, preventing the striker assembly from traveling when the device is in a cocked state.

5. The device of claim 4, the roller being rotatably mounted on an extension of the trigger that is rigidly attached to the trigger.

6. The device of claim 4, the roller being mounted on a piece of material having a plurality of rollers, the piece of material travels within a channel on the plurality of rollers; the device further comprising a movable linkage linking the piece of material to the trigger, such that pulling the trigger moves the piece of material within the channel.

7. The device of claim 6, the linkage including a first link rotatably attached to the piece of material and a second link rotatably attached to the trigger; the first link and second link being rotatably linked together.

8. The device of claim 4, the roller having a weight, the counter weight pushing the trigger in an opposite direction than the weight of the roller.

* * * * *